United States Patent
Sugino et al.

[11] Patent Number: 5,345,920
[45] Date of Patent: Sep. 13, 1994

[54] SUPERCHARGING PRESSURE CONTROL SYSTEM FOR SUPERCHARGED INTERNAL COMBUSTION ENGINES

[75] Inventors: Takuya Sugino; Masahiro Sakanushi; Kenichiro Kinoshita; Yasuyuki Sando, all of Wako, Japan

[73] Assignee: Honda Giken Kogyo Kabushiki Kaisha, Tokyo, Japan

[21] Appl. No.: 961,097

[22] Filed: Oct. 14, 1992

[30] Foreign Application Priority Data

Oct. 16, 1991 [JP] Japan .................. 3-296344
Nov. 5, 1991 [JP] Japan .................. 3-317542

[51] Int. Cl.$^5$ .............................. F02B 33/00
[52] U.S. Cl. ................................. 123/564
[58] Field of Search ...................... 60/600–603, 60/611; 123/564

[56] References Cited
U.S. PATENT DOCUMENTS

| | | | |
|---|---|---|---|
| 4,848,086 | 7/1989 | Inoue et al. | 60/602 |
| 4,849,897 | 7/1989 | Ciccarone | 60/602 |
| 4,891,947 | 1/1990 | Kishi et al. | 60/602 |
| 5,150,693 | 9/1992 | Ohnaka et al. | 123/564 X |

Primary Examiner—Michael Koczo
Attorney, Agent, or Firm—Lyon & Lyon

[57] ABSTRACT

A supercharging pressure control system for supercharged internal combustion engines includes a supercharging pressure control valve for controlling supercharging pressure of intake air, supplied by a supercharger. A desired value of the opening of the supercharging pressure control valve is determined depending on operating conditions of the engine. When the supercharging pressure detected has reached the desired value of the supercharing pressure, a feedback control mode is selected, in which the opening of the supercharging pressure control valve is controlled so as to make the supercharging pressure detected equal to the desired value of the supercharging pressure. On the other hand, when an actual value of the opening of the supercharging pressure control valve determined during the feedback control becomes smaller than the desired value of the opening of the supercharging pressure control valve, an open-loop control mode is selected, in which the opening of the supercharging pressure control valve is controlled to the desired value of the opening of the supercharging pressure control valve.

5 Claims, 25 Drawing Sheets

SUPERCHARGING PRESSURE CONTROL SYSTEM FOR SUPERCHARGED INTERNAL COMBUSTION ENGINES

BACKGROUND OF THE INVENTION

1. Field of the Invention

This invention relates to a supercharging pressure control system for supercharged internal combustion engines.

2. Prior Art

Conventionally, there has been proposed, e.g. by Japanese Provisional Patent Publication (Kokai) No. 58-170825, a supercharging pressure control system for a supercharged internal combustion engine which has a supercharger arranged in the intake passage of the engine, a bypass passage bypassing the supercharger, a supercharging pressure control valve for opening and closing the bypass passage, driving means for driving the supercharging pressure control valve, and a control device for controlling the driving means, wherein a set value of supercharging pressure determined according to the rotational speed of the engine and a signal indicative of a degree of acceleration demanded (i.e. opening of a throttle valve) is compared with an actual value of supercharging pressure detected in the intake passage, and the opening of the supercharging pressure control valve is controlled in response to a signal generated based on results of the comparison. That is, according to this prior art system, the opening of the supercharing pressure control valve is feedback-controlled over the whole region of supercharging pressure to make the supercharging pressure equal to the set valve thereof. However, such a feedback control of supercharging pressure over the whole region thereof is slow in control speed in a transient state of supercharging pressure controlled.

To eliminate this inconvenience, a control method may be used in a supercharging pressure control system for a supercharged internal combustion engine, which method comprises feedback-controlling the supercharging pressure (pressure P2 upstream of the throttle valve or pressure PB downstream of same) in a high pressure region alone, and open loop-controlling same in regions outside the high pressure region. More specifically, according to the method, when the engine rotational speed (NE) or the throttle valve opening ($\theta$TH) has reached a corresponding set value, the control mode is changed from an open loop control mode in which the opening of the supercharging pressure control valve is open loop-controlled to a desired value (map value) dependent on operating conditions of the engine, i.e. the engine rotational speed NE and the throttle valve opening $\theta$TH, to a feedback control mode in which the opening of the supercharging pressure control valve is feedback-controlled so as to make the supercharging pressure equal to a desired value thereof, whereas when the engine rotational speed NE or the throttle valve opening $\theta$TH becomes lower or smaller than the corresponding set value, the control mode is changed from the feedback control mode to the open-loop control mode.

Further, there has also been proposed, e.g. by Japanese Provisional Patent Publication (Kokai) No. 62-153523, a supercharging pressure control system for a supercharged internal combustion engine, which is adapted to perform the feedback control when the vehicle on which the engine is installed is cruising, and when the vehicle is quickly accelerated, the feedback control is inhibited to perform the open-loop control by the use of a learned value of the opening of the supercharging pressure control valve obtained during the feedback control, to effect smooth transition from the open-loop control to the feedback control.

However, according to the former prior art in which the supercharging pressure is feedback-controlled in the high pressure region alone, and open-loop controlled in the other regions, if the intake air is at normal temperature, there is almost no variation in a value of the supercharging pressure assumed before transition from the open-loop control mode to the feedback control mode, which is carried out when the engine rotational speed NE or the throttle valve opening $\theta$TH has reached the corresponding set value, and at the same time this value is approximately equal to the desired value of supercharging pressure used in the feedback control. Therefore, this change in the control mode causes no shocks, such as unexpected disturbing vibrations or noise. However, if the temperature of intake air varies from normal temperature due to a change in the ambient temperature or operating conditions of the engine, such as the speed of the vehicle, the value of the supercharging pressure assumed immediately before the transition varies with this variation in the intake air. For example, when the temperature of intake air is much lower than normal temperature, the supercharging pressure value assumed immediately before the transition becomes much lower than the desired value of supercharging pressure, and the supercharging pressure sharply rises to the desired value of supercharging pressure in the transition from the open-loop control to the feedback control, which results in occurrence of shocks, such as unexpected disturbing vibrations and noise. Even if the desired value of supercharging pressure is corrected based on a signal from an intake air temperature sensor, occurrence of the shocks cannot be avoided due to delayed response of the sensor. On the other hand, when The intake air temperature is much higher than normal temperature, the supercharging pressure value assumed immediately before the transition becomes much higher than the desired value of supercharging pressure, so that the supercharging pressure drastically drops to the desired value in the transition, which similarly causes the above-mentioned shocks.

The same shocks will occur in transition from the feedback control to the open-loop control. More specifically, if the intake air is at normal temperature and the engine is under the same operating conditions, upon transition from the feedback control to the open-loop control after the engine rotational speed NE or the throttle valve opening $\theta$TH becomes lower or smaller than the corresponding set value, there is almost no variation in a value of the supercharging pressure assumed immediately after the transition, and at the same time the value of the supercharging pressure is approximately equal to the desired value of supercharging pressure. Therefore, no shocks such as unexpected vibrations and noise will occur. However, if the intake air temperature becomes much lower than normal temperature due to a change in the operating conditions of the engine, the supercharging pressure value to be assumed immediately after the transition also becomes much lower than the desired value of supercharging pressure. Therefore, in the transition from the feedback control to the open-loop control, the supercharging pressure drastically drops from the desired value of supercharging pressure, producing shocks, such as unexpected vibrations and noise. When the intake air temperature is much higher than normal temperature as well, the same shocks are produced, since the supercharging pressure value to be assumed after the transition is much higher than the desired value of supercharging pressure, and hence the supercharging pressure sharply rises from the desired value of supercharging pressure.

According to the latter prior art (Japanese Provisional Patent Publication (Kokai) No. 62-153523), in which the feedback control is inhibited, i.e. the open-loop control is carried out by the use of the learned value of opening of the supercharging pressure control valve obtained during the feedback control, when the engine is quickly accelerated, if there is a large difference in a value of the intake air temperature at which the learned value of opening of the supercharging pressure control valve is calculated and stored, and a value of the intake air temperature at which the control mode is changed from the open-loop control mode to the feedback control mode, the above-mentioned shocks, such as the unexpected disturbing vibrations and noise, are produced during the transition from the open-loop control to the feedback control.

SUMMARY OF THE INVENTION

It is the object of the invention to provide a supercharging pressure control system for a supercharged internal combustion engine, which is capable of effecting transition from the open-loop control to the feedback control or vice versa, without producing shocks, such as unexpected vibrations and noise, even if the intake air temperature has changed largely.

To attain the above object, the present invention provides a supercharging pressure control system for a supercharged internal combustion engine including an intake passage, and a supercharger arranged in the intake passage, the supercharging pressure control system comprising supercharging pressure-detecting means arranged in the intake passage for detecting supercharging pressure of intake air supplied to the engine, obtained by the supercharger, a supercharging pressure control valve for controlling the supercharging pressure, driving means for driving the supercharging pressure control valve, and control means for controlling the driving means.

The supercharging pressure control system according to the invention is characterized in that the control means includes:

desired supercharging pressure value-setting means for setting a desired value of the supercharging pressure;

valve opening-detecting means for detecting opening of the supercharging pressure control valve;

desired opening value-setting means for setting a desired value of the opening of the supercharging pressure control valve depending on operating conditions of the engine; and control mode-selecting means for selecting a feedback control mode in which the opening of the supercharging pressure control valve is controlled so as to make the supercharging pressure detected by the supercharging pressure-detecting means equal to the desired value of the supercharging pressure, when the former has reached latter, and on the other hand selecting an open-loop control mode in which the opening of the supercharging pressure control valve is controlled to the desired value of the opening of the supercharging pressure control valve, when an actual value of the opening of the supercharging pressure control valve assumed during the feedback control becomes smaller than the desired value of the opening of the supercharging pressure control valve.

The engine includes an intercooler arranged across the intake passage for cooling the intake air pressurized by the supercharger. Preferably, the supercharging pressure control system includes engine rotational speed-detecting means for detecting the rotational speed of the engine, and temperature-detecting means for detecting a temperature of a coolant supplied to the intercooler, and the desired supercharging pressure value-setting means is adapted to set the desired value of the supercharging pressure either to a first value determined according to the rotational speed of the engine or to a second value determined according to the temperature of the coolant.

More preferably, the desired supercharging pressure value-setting means sets the desired value of the supercharging pressure to the lower one of the first value and the second value.

The engine includes a throttle valve arranged across the intake passage. Preferably, the supercharging pressure control system includes throttle valve opening-detecting means for detecting opening of the throttle valve, and the control means includes reference throttle valve opening-setting means for setting a reference value of the opening of the throttle valve according to the rotational speed of the engine, the control mode-selecting means further comparing the opening of the throttle valve detected by the throttle valve opening-detecting means with the reference value of the opening of the throttle valve, when the actual value of the opening of the supercharging pressure control valve assumed during the feedback control is equal to or larger than the desired value of the opening of the supercharging pressure control valve, and selecting the open-loop control mode when the opening of the throttle valve becomes smaller than the reference value of the opening of the throttle valve.

More preferably, the actual value of the opening of the supercharging pressure control valve assumed during the feedback control is an averaged value of actual values of the opening of the supercharging pressure control valve including a newest value of the opening detected during the feedback control.

The above and other objects, features, and advantages of the invention will become more apparent from the ensuing detailed description taken in conjunction with the accompanying drawings.

BRIEF DESCRIPTION OF THE DRAWINGS

FIG. 12 is a $\theta$cc map in which values of the desired opening value $\theta$cc of the supercharging pressure control valve are provided in a three-dimensional manner, corresponding to values of the engine rotational speed NE and those of the throttle valve opening $\theta$TH;

DETAILED DESCRIPTION

The invention will now be described in detail with reference to the drawings showing embodiments thereof.

Figure 1:
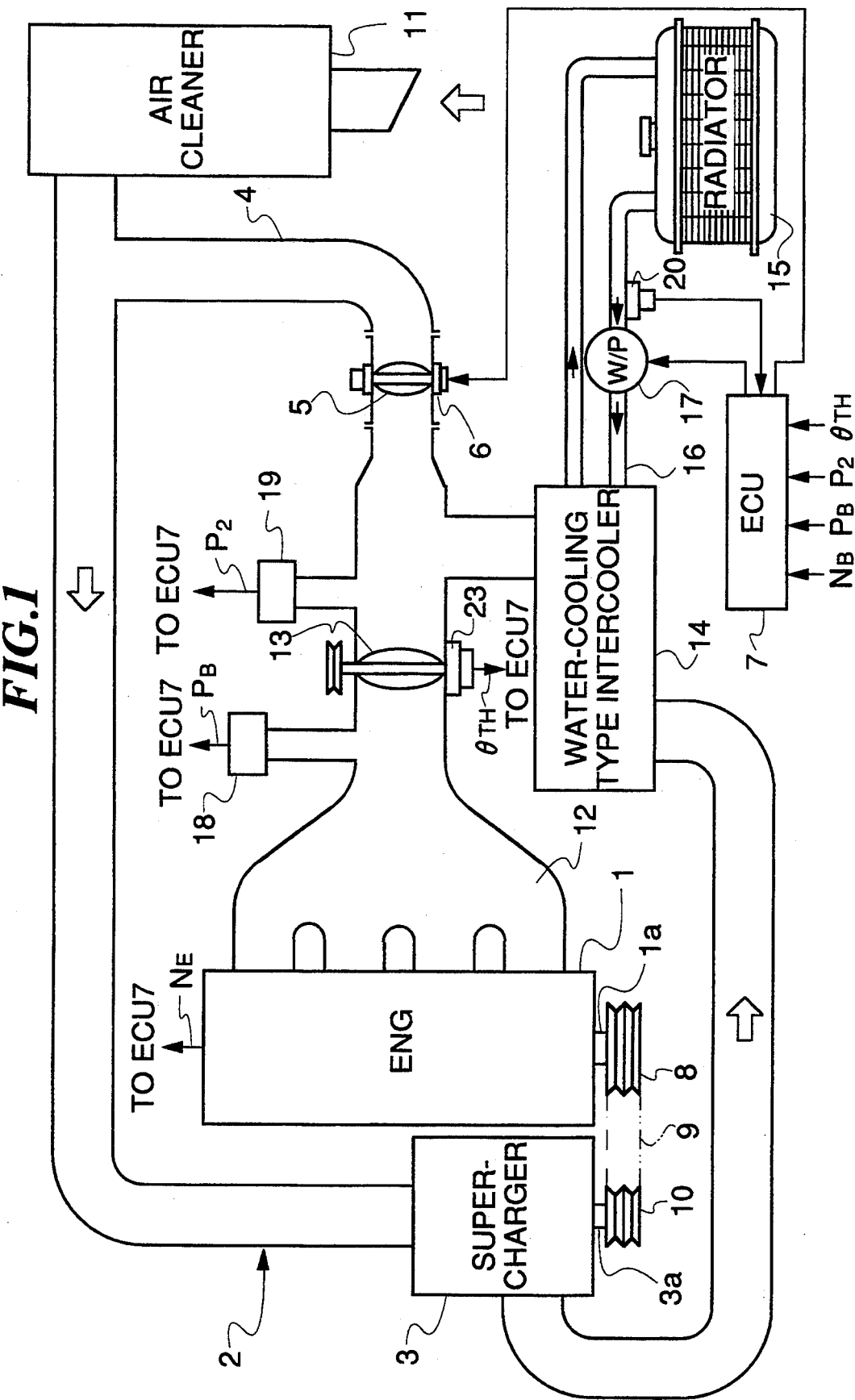
FIG. 1 is a schematic diagram showning the whole arrangement of a supercharging pressure control system for a supercharged internal combustion engine, according to a first embodiment of the invention.

Referring first to FIG. 1, there is shown a supercharging pressure control system for a supercharged internal combustion engine, according to a first embodiment of the invention. In the figure, reference numeral 1 designates an internal combustion engine, which has a supercharger 3 arranged in an intake passage 2 thereof. A bypass passage 4 is connected to the intake passage 2, which bypasses the supercharger 3. A supercharging pressure control valve 5 is arranged in the bypass passage 4 for opening and closing the bypass passage 4. A stepping motor (driving means) 6 is coupled to the control valve 5 for driving same. The stepping motor 6 is electrically connected to an electronic control unit (control unit) 7, hereinafter referred to as "the ECU", to be controlled by a signal therefrom. The engine 1 has a crankshaft 1a to which is connected a drive shaft 3a of the supercharger 3 via a pulley 8, a belt 9, and a pulley 10 so that the rotation of the crankshaft 1a is constantly transmitted to the drive shaft 3a.

An air cleaner 11 is arranged on an upstream end of the intake passage 2, while an intake manifold 12 forms a downstream end of the intake passage 2 for guiding intake air to an intake port of each cylinder of the engine 1. The supercharger 3 is arranged at a location upstream of a throttle valve 13. A water-cooling type intercooler 14 is arranged across the intake passage 2 at an intermediate location between the supercharger 3 and the throttle valve 13, for cooling intake air pressurized by the supercharger. The intercooler 14 is supplied with an engine coolant, which circulates under pressure through a radiator 15 and piping 16.

The ECU 7 is supplied with electric signals indicative of the engine rotational speed NE detected by an NE sensor, not shown, a supercharging pressure PB downstream of the throttle valve 13 detected by a PB sensor 18, a supercharging pressure P2 upstream of the throttle valve 13 detected by a P2 sensor 19, a throttle valve opening $\theta$TH detected by a throttle valve opening sensor 23, and an intercooler coolant temperature TWIC detected by a coolant temperature sensor 20.

The ECU 7 is constructed such that when the supercharging pressure P2 or PB upstream or downstream of the throttle valve 13 (hereinafter simply referred to as "the supercharging pressure PB") reaches a desired maximum supercharging pressure value POBJ, it changes the control mode of controlling supercharging pressure from an open-loop control mode to a feedback control mode in which the opening of the supercharging pressure control valve 5 is controlled so as to make the supercharging pressure PB equal to the desired maximum supercharging pressure value POBJ, whereas when an averaged value $\theta$REF of actual opening values of the supercharging pressure control valve 5 (hereinafter referred to as "the averaged actual opening value") becomes smaller than a desired opening value $\theta$OBJ dependent upon current operating conditions of the engine, it changes the control mode from the feedback control mode to the open-loop control mode in which the opening of the supercharging pressure control valve 5 is controlled to the desired opening value $\theta$OBJ.

The operation of the supercharging pressure control system according to the first embodiment constructed as above will now be described.

Figure 3:
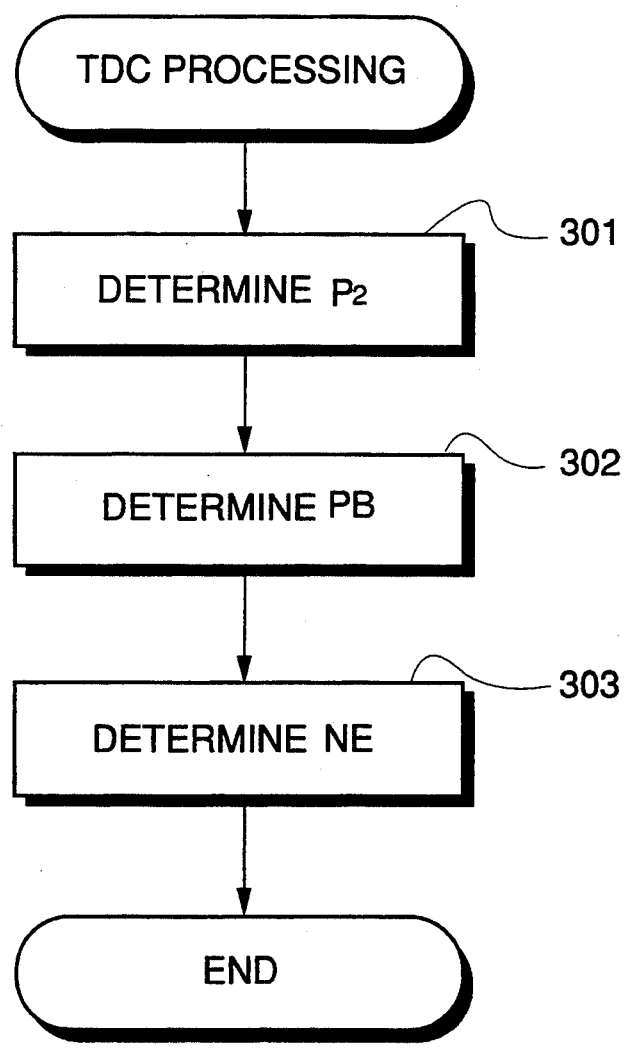
FIG. 3 is a flowchart showing a subroutine for performing a TDC processing.

First, the ECU 7 executes a TDC processing as illustrated in FIG. 3. In the TDC processing, the supercharging pressure P2 is determined based on an electric signal indicative of the supercharging pressure P2 upstream of the throttle valve 13 detected by the P2 sensor 19, at a step 301. Then, the supercharging pressure PB is determined based on an electric signal indicative of the supercharging pressure PB downstream of the throttle valve 13 detected by the PB sensor 18, at a step 302. Further, at a step 303, the engine rotational speed NE is determined based on an electric signal indicative of the engine rotational speed NE detected by the NE sensor, followed by terminating the program. This TDC processing is executed whenever a TDC signal pulse indicative of a TDC position of each cylinder is generated. Newly-determined values of the supercharging pressure P2, the supercharging pressure PB, and the engine rotational speed NE are stored into the memory means of the ECU 7 whenever the TDC processing is carried out.

Figure 2:
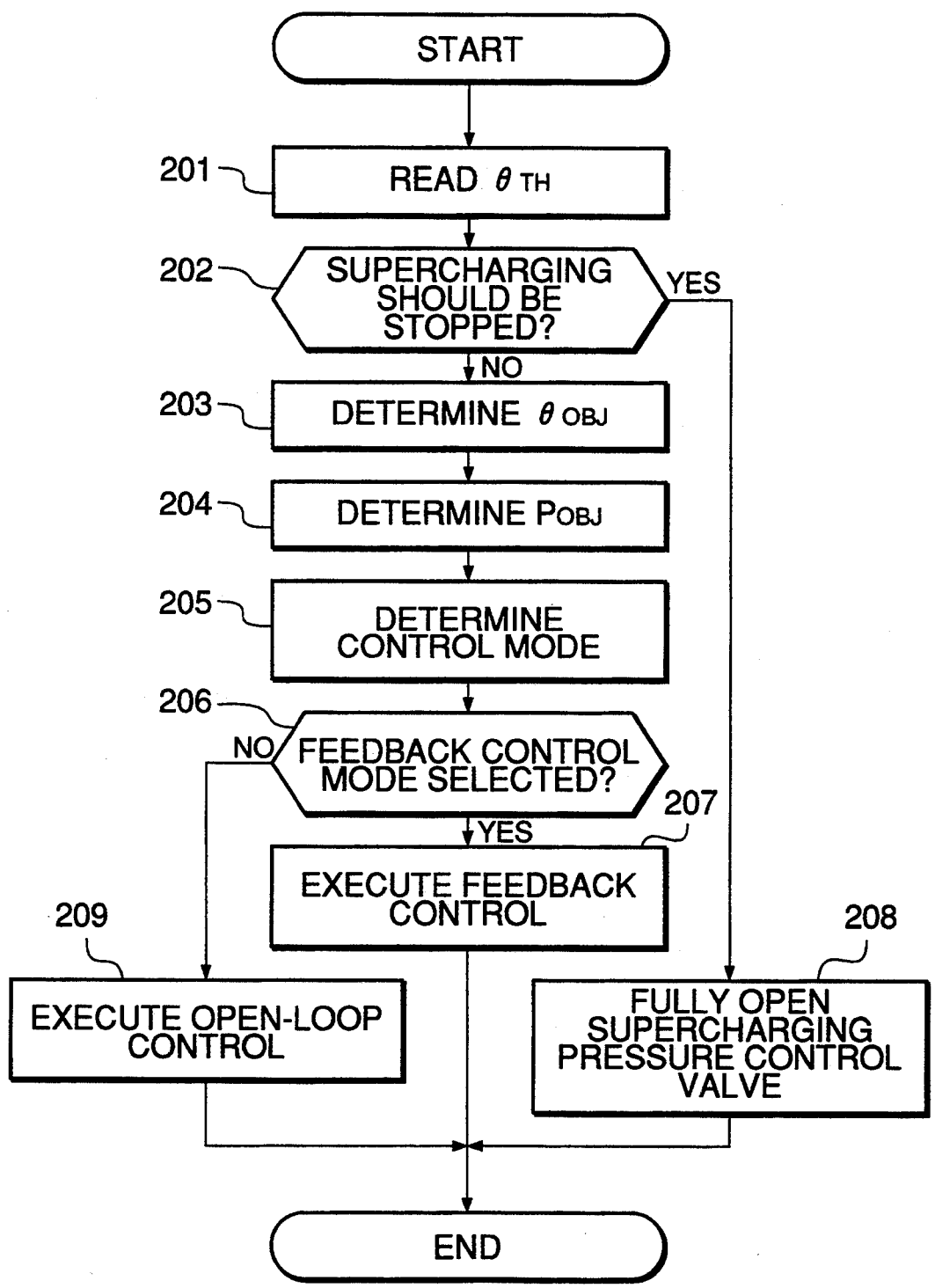
FIG. 2 is a flowchart showing a main routine for performing supercharging pressure control by the supercharging pressure control system shown in FIG. 1.

Following the execution of the TDC processing, the ECU 7 carries out a main routine shown in FIG. 2. This main routine shown in FIG. 2 is carried out at regular time intervals. In the main routine, first at a step 201, a CPU, not shown, of the ECU 7 reads a present value of the throttle valve opening $\theta$TH, which has been determined based on an electric signal supplied from the throttle valve opening sensor 23 and stored into memory means, not shown, of the ECU 7. Then, it is determined whether or not supercharging of intake air should be stopped. If the answer to this question is affirmative (YES), i.e. if the supercharging pressure P2 or PB, and/or the temperature of intake air are/is abnormally high and hence supercharging of intake air should be stopped, the program proceeds to a step 208, where the opening of the supercharging pressure control valve 5 is controlled to the maximum value, i.e. the valve 5 is fully opened. This allows intake air pressurized upstream of the throttle valve 13, i.e. supercharging pressure P2, to escape from the intake passage 2 via the bypass passage 4, preventing the supercharger 3 from effecting supercharging of intake air. After execution of the step 208, the main routine is terminated.

On the other hand, if the answer to the question of the step 202 is negative (NO), i.e. if it is not necessary to stop supercharging, the program proceeds to a step 203, where the desired opening value $\theta$OBJ of the supercharging pressure control valve 5 to be used in the open-loop control is calculated, and then to a step 204, where the desired maximum supercharging pressure value POBJ to be used in the feedback control is calculated. At a step 205 following the step 204, the control mode is selected or determined between the open-loop control mode and the feedback control mode. Then, it is determined at a step 206 whether or not the control mode selected at the step 205 is the feedback control mode. If the answer to this question is affirmative (YES), the program proceeds to a step 207 to carry out the feedback control, in which the opening of the supercharging pressure control valve 5 is controlled so as to make the supercharging pressure PB equal to the desired maximum supercharging pressure value POBJ calculated at the step 204. On the other hand, if the answer to the question of the step 206 is negative (NO), the program proceeds to a step 209 to carry out the open-loop control, in which the opening of the supercharging pressure control valve 5 is controlled to the desired opening value $\theta$OBJ calculated at the step 203.

Figure 5:
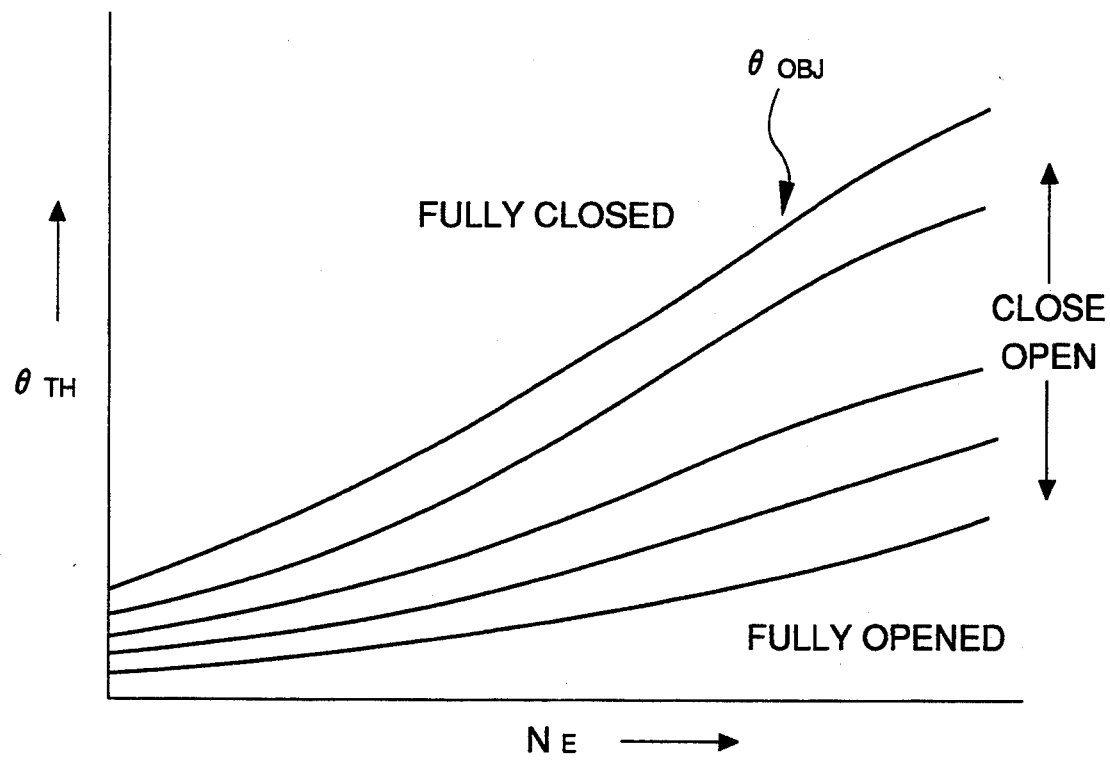
FIG. 5 shows a $\theta OBJ$ map for determining a desired opening value $\theta OBJ$ of a supercharging pressure control valve, used in open-loop control of supercharging pressure.

The calculation of the desired opening value $\theta$OBJ at the step 203 is effected by retrieving a $\theta$OBJ map stored in the aforementioned memory means of the ECU 7, which is set, e.g. as shown in FIG. 5, such that optimum values of the desired opening value $\theta$OBJ are provided corresponding to values of the engine rotational speed NE and those of the throttle valve opening $\theta$TH. That is, the desired opening value $\theta$OBJ is calculated by retrieving the $\theta$OBJ map shown in FIG. 5 according to the newest value of the engine rotational speed NE and the newest value of the throttle valve opening $\theta$TH.

Figure 6:
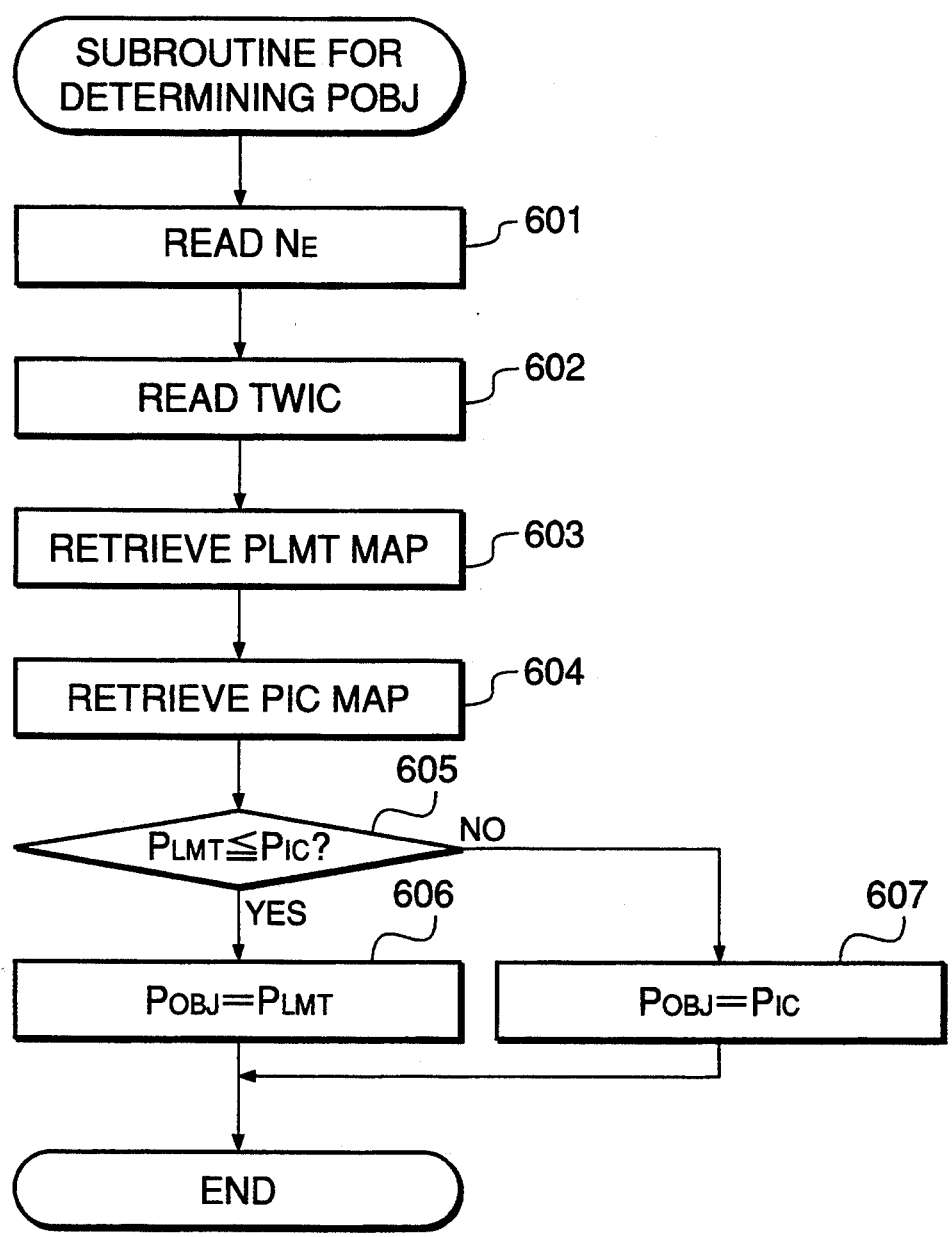
FIG. 6 is a flowchart of a subroutine for determining a desired maximum supercharging pressure value POBJ.
Figure 7:
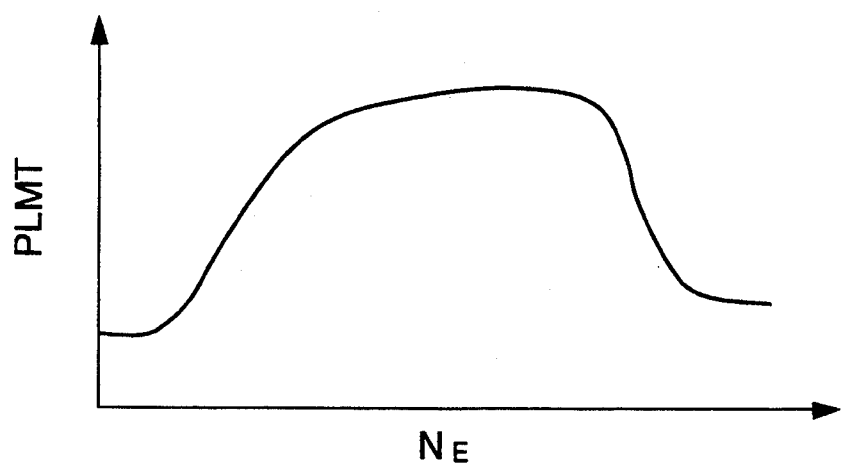
FIG. 7 shows a PLMT map for determining a first desired maximum value PLMT of supercharging pressure dependent on the rotational speed of the engine.
Figure 8:
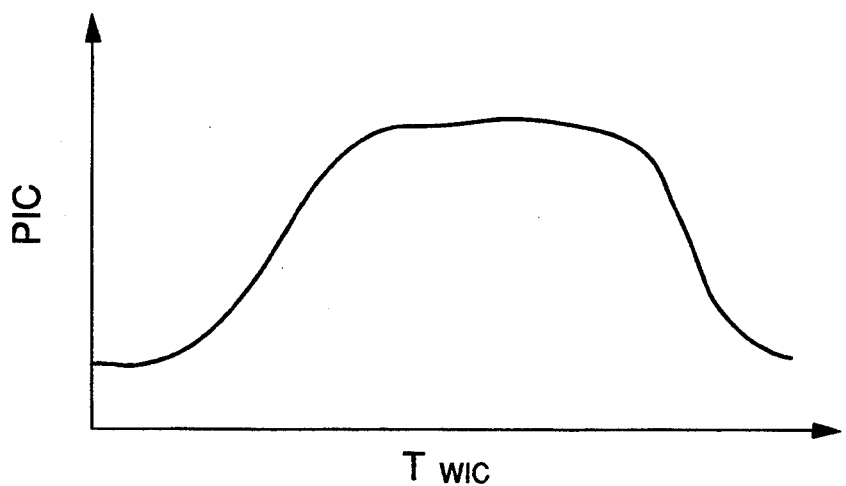
FIG. 8 shows a PIC map for determining a second desired maximum value PIC of supercharging pressure dependent on the temperature of an intercooler.

The calculation of the desired maximum supercharging pressure value POBJ at the step 204 of the main routine is effected by execution of a subroutine for determining the desired maximum supercharging pressure value POBJ, shown in FIG. 6. In this subroutine, the newest value of the engine rotational speed NE is read again at a step 601, and the newest value of the intercooler coolant temperature TWIC calculated and stored by background processing based on a signal supplied from the coolant temperature sensor 20 is read at a step 602. Then, the program proceeds to a step 603, where a first desired maximum supercharging pressure value PLMT dependent on the engine rotational speed NE is calculated by retrieving a PLMT map stored in the memory means of the ECU 7, which is set, e.g. as shown in FIG. 7, such that optimum values of the first desired maximum supercharging pressure value PLMT are provided corresponding to values of the engine rotational speed NE. Then, at a step 604, a second desired maximum supercharging pressure PIC dependent on the intercooler coolant temperature TWIC is calculated by retrieving a PIC map stored in the memory means of the ECU 5, which is set, e.g. as shown in FIG. 8, such that optimum values of the second desired maximum supercharging pressure value PIC are provided corresponding to values of the intercooler coolant temperature TWIC. Then, the program proceeds to a step 605, where it is determined whether or not the first desired maximum supercharging pressure value PLMT is equal to or lower than the second desired maximum supercharging pressure value PIC. If the answer to this question is affirmative (YES), i.e. if PLMT≦PIC, the desired supercharging pressure value POBJ is set to the first desired maximum supercharging pressure value PLMT at a step 606, followed by the program proceeding to step 205 in FIG. 2. On the other hand, if the answer to the question of the step 605 is negative (NO), i.e. if PLMT>PIC, the desired supercharging pressure value POBJ is set to the second desired maximum supercharging pressure value PIC at a step 607, followed by the program returning to the step 205 of the main routine of FIG. 2.

Thus, the desired maximum supercharging pressure value POBJ can be more safely determined by selecting the lower one of the two desired maximum supercharging pressure values PLMT and PIC.

Figure 4:
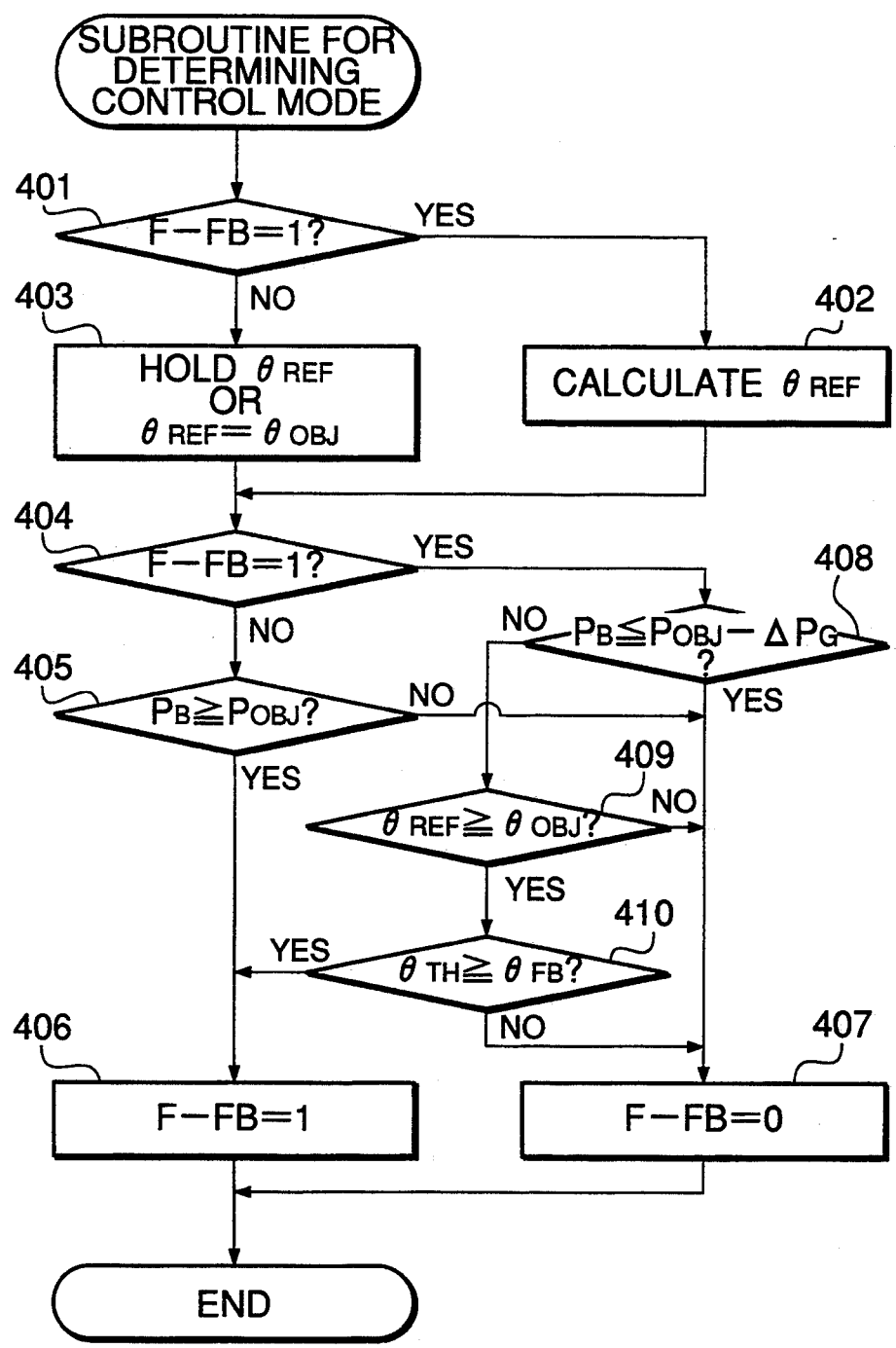
FIG. 4 is a flowchart showing a subroutine for determining the control mode.

The determination of the control mode at the step 205 is executed by executing a subroutine for determining the control mode, shown in FIG. 4.

Figure 9:
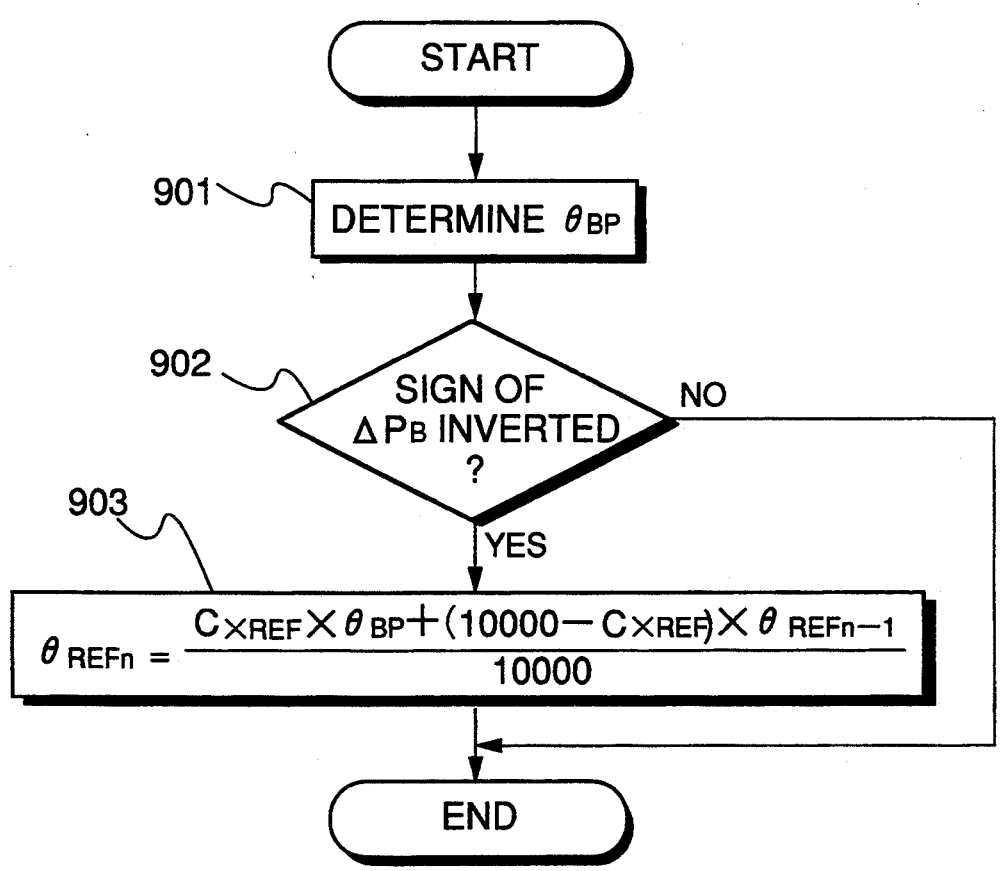
FIG. 9 is a flowchart showing a subroutine for calculating an averaged value $\theta$REF of actual opening values of the supercharging pressure control valve detected during the feedback control.
Figure 10:
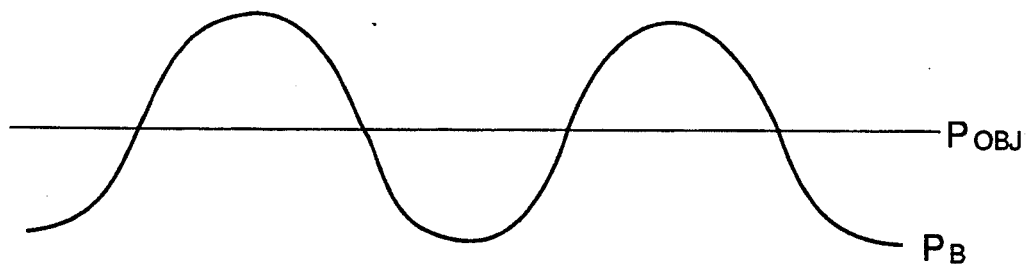
FIG. 10 is a diagram showing changes of the supercharging pressure PB in the vicinity of the desired maximum supercharging pressure value POBJ.
Figure 11:
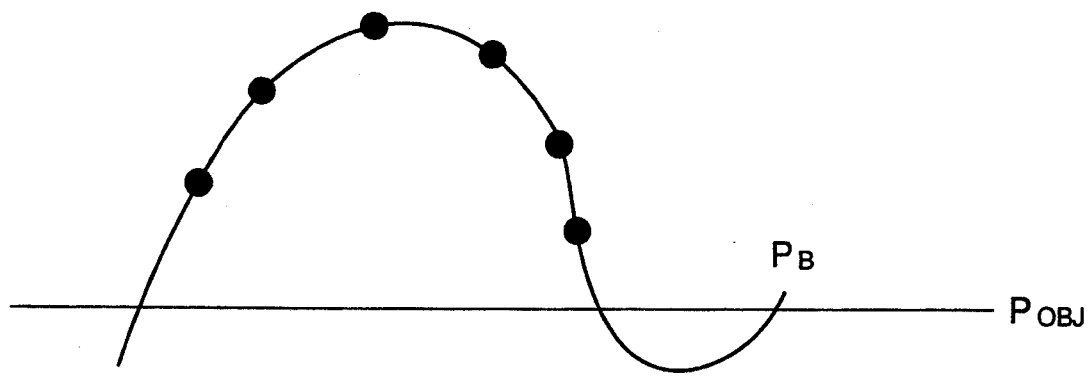
FIG. 11 is a diagram showing largely-hunting changes of the supercharging pressure PB.
Figure 12:
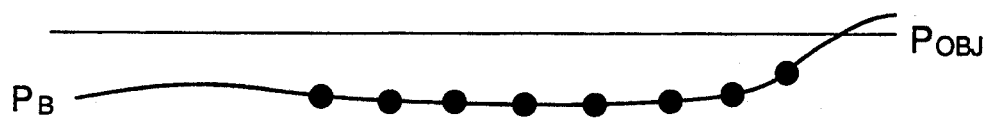
FIG. 12 is a diagram showing changes of the supercharging pressure PB occurring constantly below the desired maximum supercharging pressure value POBJ.

In this subroutine, first at a step 401, it is determined whether or not the feedback control of supercharging pressure is being carried out by determining whether or not a control mode-indicating flag F-FB is equal to "1". If the answer to this question is affirmative (YES), i.e. if during the feedback control, the program proceeds to a step 402, where the averaged actual opening value $\theta$REF is calculated, and then the program proceeds to a step 404. The calculation of the averaged actual opening value $\theta$REF at the step 402 is effected by executing a subroutine shown in FIG. 9. In this $\theta$REF-calculating subroutine, first at a step 901, an actual opening value $\theta$BP of the supercharging pressure control valve 5 is determined based on the number of pulses supplied from the ECU 7 to the stepping motor 6. Then, at a step 902, it is determined whether or not the sign of a value of $\Delta$PB ($\Delta$PB=the desired maximum supercharging pressure value POBJ−the supercharging pressure PB) has been inverted. If the answer to this question is affirmative (YES), i.e. if the sign has been inverted, the program proceeds to a step 903, where there is calculated a present value $\theta$REFn of the averaged actual opening value $\theta$REF of the supercharging pressure control valve 5 during the feedback control, followed by returning to the control mode-determining subroutine of FIG. 4, whereas if the answer to the question is negative (NO), i.e. the sign has not been inverted, this subroutine is terminated, i.e. the program returns to the control mode-determining subroutine in FIG. 4, without calculating a new value $\theta$REFn of the averaged actual opening value $\theta$REF. By calculating the present value $\theta$REFn of the averaged actual opening value $\theta$REF of the supercharging pressure control valve 5 during the feedback control only when the sign of $\Delta$PB has been inverted, as described above, it is possible to calculate the present value $\theta$REFn of the averaged actual opening value $\theta$REF corresponding to the desired maximum supercharging pressure value POBJ in a mope accurate manner. This is because the supercharging pressure value PB assumes a value closest to the desired maximum supercharging pressure value POBJ when the sign of $\Delta$PB has been inverted (see FIG. 10). If the calculation of the present value $\theta$REFn at the step 903 is also calculated when the sign of $\Delta$PB has not been inverted (e.g. as shown in FIG. 11, when the supercharging pressure PB is far beyond the desired maximum supercharging pressure value POBJ, or as shown in FIG. 12, when the supercharging pressure PB is constantly below the desired maximum supercharging pressure value POBJ), it is impossible to accurately calculate the present value $\theta$REFn corresponding to the desired maximum supercharging pressure value POBJ.

On the other hand, if the answer to the question of the step 401 in FIG. 4 is negative (NO), i.e. if during the open-loop control, the program proceeds to a step 403, where the averaged actual opening value $\theta$REF is held to an immediately preceding value thereof ($\theta$REFn−1) or set to the desired opening value $\theta$OBJ depending on the supercharging pressure PB, without renewing the averaged actual opening value $\theta$REF, and then the program proceeds to the step 404.

At the step 404 in FIG. 4, it is determined whether or not the feedback control of supercharging pressure is being effected by determining whether or not the control mode-indicating flag F-FB is equal to 1. If the answer to this question is negative (NO), i.e. if during the open-loop control, the program proceeds to a step 405, where it is determined whether or not the supercharging pressure PB is equal to or higher than the desired maximum supercharging pressure value POBJ calculated at the step 204 in FIG. 2. If the answer to this question is affirmative (YES), i.e. if the supercharging pressure PB has become equal to or higher than the desired maximum supercharging pressure value POBJ during the open-loop control, the control mode-indicating flag F-FB is set to "1" at a step S406 to indicate that the feedback control mode has been selected, followed by terminating the subroutine of FIG. 4 and returning to the main routine of FIG. 2. In this case, the answer to the question of the step 206 in FIG. 2 becomes affirmative (YES), so that the program proceeds to the step 207, where the control mode is changed from the open-loop control mode to the feedback control mode. On the other hand, if the answer to the question of the step 405 is negative (NO), i.e. if the supercharging pressure PB is lower than the desired maximum supercharging pressure value POBJ, during the open-loop control, the flag F-FB is set to "0" at a step 407 to indicate that the open-loop control mode has been selected, followed by terminating the subroutine of FIG. 4 and returning to the main routine of FIG. 2. In this case, the answer to the question of the step 206 becomes negative (NO), so that the program proceeds to the step 209, where the open-loop control is continued.

On the other hand, if the answer to the question of the step 404 is affirmative (YES), i.e. if during the feedback control, the program proceeds to a step 408, where it is determined whether or not the supercharging pressure PB is equal to or lower than a value (POBJ−ΔPG) obtained by subtracting ΔPG from the desired maximum supercharging pressure value POBJ. ΔPG is set for the purpose of providing hysteresis for prevention of hunting. If the answer to the question of the step 408 is affirmative (YES), i.e. if PB≦POBJ−ΔPC, the program proceeds to a step 407, where the flag F-FB is set to "0" to indicate that the open-loop control mode has been selected, followed by terminating the FIG. 4 subroutine and returning to the main routine shown in FIG. 2. In this case, the answer to the question of the step 206 becomes negative (NO), so that the program proceeds to the step 209, where the control mode is changed from the feedback control mode to the open-loop control mode.

On the other hand, if the answer to the question of the step 408 is negative (NO), i.e. if PB>POBJ−ΔPC, the program proceeds to a step 409, where it is determined whether or not the averaged actual opening value θREF is equal to or higher than the desired opening value θOBJ determined from the θOBJ map shown in FIG. 5. If the answer to this question is negative (NO), i.e. if θREF<θOBJ, which means that the required level of supercharging pressure determined by present operating conditions of the engine, i.e. the present value of the engine rotational speed NE and that of the throttle valve opening θTH, is on a lower load side or lower than the desired supercharging pressure value POBJ, it is judged that if the feedback control is continued, the supercharging pressure PB may rise even higher than the required level of supercharging pressure, so that the program proceeds to the step 407. In this case as well, the program will proceed to the step 209 in the main routine to change from the feedback control to the open-loop control.

Figure 15:
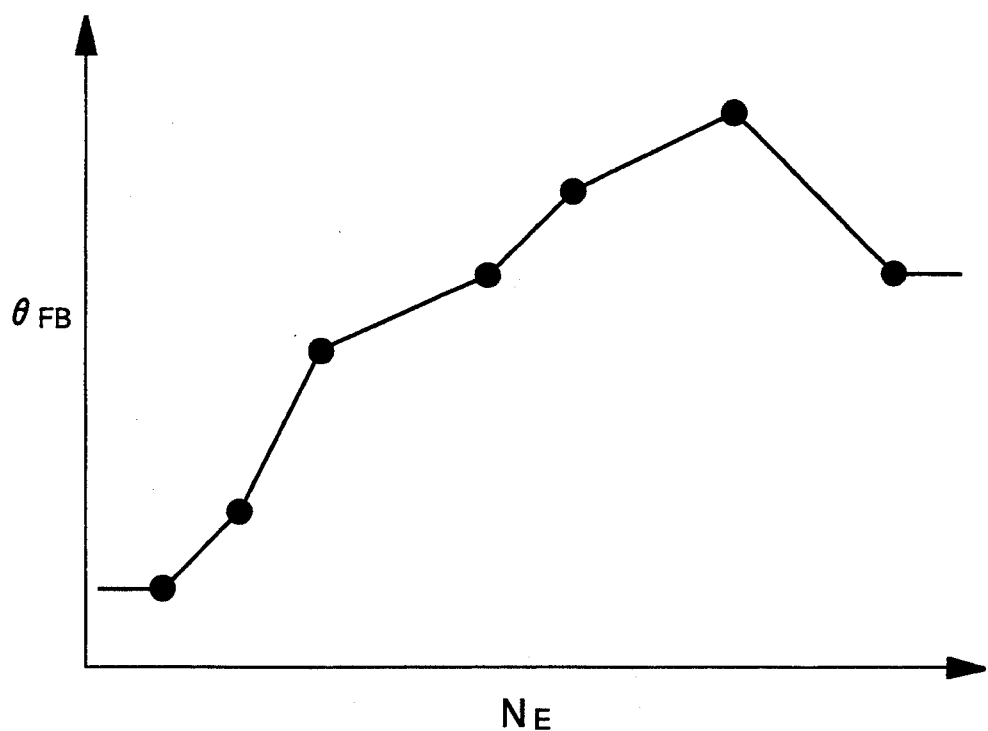
FIG. 15 shows a $\theta$FB map for determining a reference throttle valve opening value $\theta$FB of a throttle valve dependent on the rotational speed of the engine.

On the other hand, if the answer to the question of the step 409 is affirmative (YES), i.e. if θREF≧θOBJ, it is judged that the required level of supercharging pressure determined by present operating conditions of the engine, i.e. the present value of the engine rotational speed NE and that of the throttle valve opening θTH, is substantially equal to the desired maximum supercharging pressure value POBJ, and hence the feedback control should be continued. Then, the program proceeds to a step 410, where it is determined whether or not the throttle valve opening θTH is equal to or higher than a reference throttle valve opening value θFB. The reference throttle valve opening value θFB is a parameter varying with the engine rotational speed NE and used for determining whether the feedback control should be continued, a θFB map of which is stored in the memory means of the ECU 7. The map is set, as shown in FIG. 15, such that optimum values of the reference throttle valve opening value θFB are provided corresponding to values of the engine rotational speed NE. If the answer to the question of the step 410 is negative (NO), i.e. if the throttle valve opening θTH has suddenly changed below the reference throttle valve opening value θFB, the program proceeds to the step S407. In this case as well, the program will proceed to the step 209 in the main routine to change from the feedback control to the open-loop control. Thus, when the throttle valve opening θTH has suddenly changed to a value smaller than the reference throttle valve opening value θFB, the feedback control is immediately stopped or changed into the open-loop control, which enables to prevent a delayed transition to the open-loop control. Assuming that the step 410 were not provided, even if the throttle valve opening θTH has suddenly changed to a small value, the changeover from the feedback control to the open-loop control would be effected only after it is determined at the step 408 that the supercharging pressure PB has become equal to or smaller than the value of POBJ−ΔPG, which would result in a significant delay in changeover of the control mode.

On the other hand, if the answer to the question of the step 410 is affirmative (YES), i.e. if θTH≧θFB, the program proceeds to the step 406, where the flag F-FB is set to "1" to indicate that the feedback control mode is selected, followed by terminating the subroutine shown in FIG. 4 and returning to the main routine shown in FIG. 2. In this case, the answer to the question of the step 206 becomes affirmative (YES), so that that the program proceeds to the step 207 so as to continue the feedback control.

Figure 13:
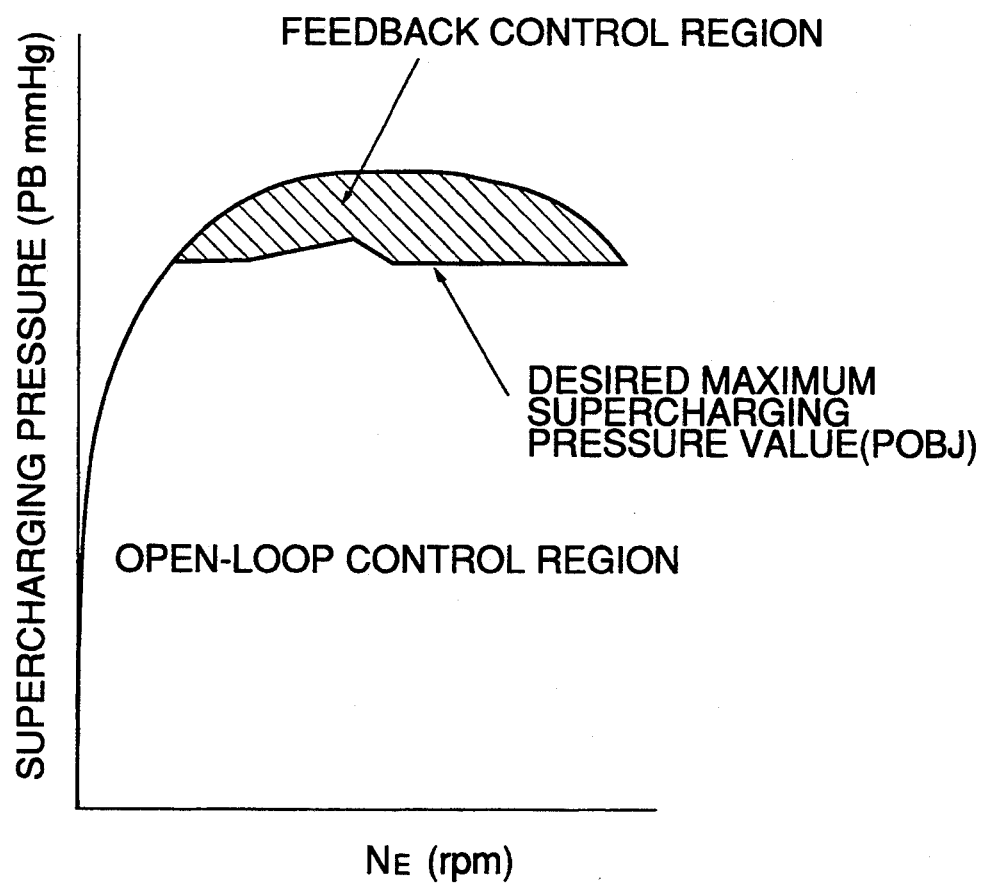
FIG. 13 is a diagram illustrating an open-loop control region and a feedback control region.

As described heretofore, according to the supercharging pressure control system of the first embodiment of the invention, as shown in FIG. 13, the feedback control is carried out in a region where the supercharging pressure PB is equal to or higher than the desired maximum supercharging pressure value POBJ, whereas the open-loop control is carried out in a region where the supercharging pressure PB is lower than the desired maximum supercharging pressure value POBJ, which enables to attain the supercharging pressure control in a more quick and more accurate manner than when the feedback control is carried out over the whole region. Moreover, in the feedback control of the present embodiment, the opening of the supercharging pressure control valve 5 is controlled so as to make the supercharging pressure PB equal to the desired maximum supercharging pressure value POBJ, which enables to prevent the supercharging pressure PB from becoming abnormally high.

Figure 14:
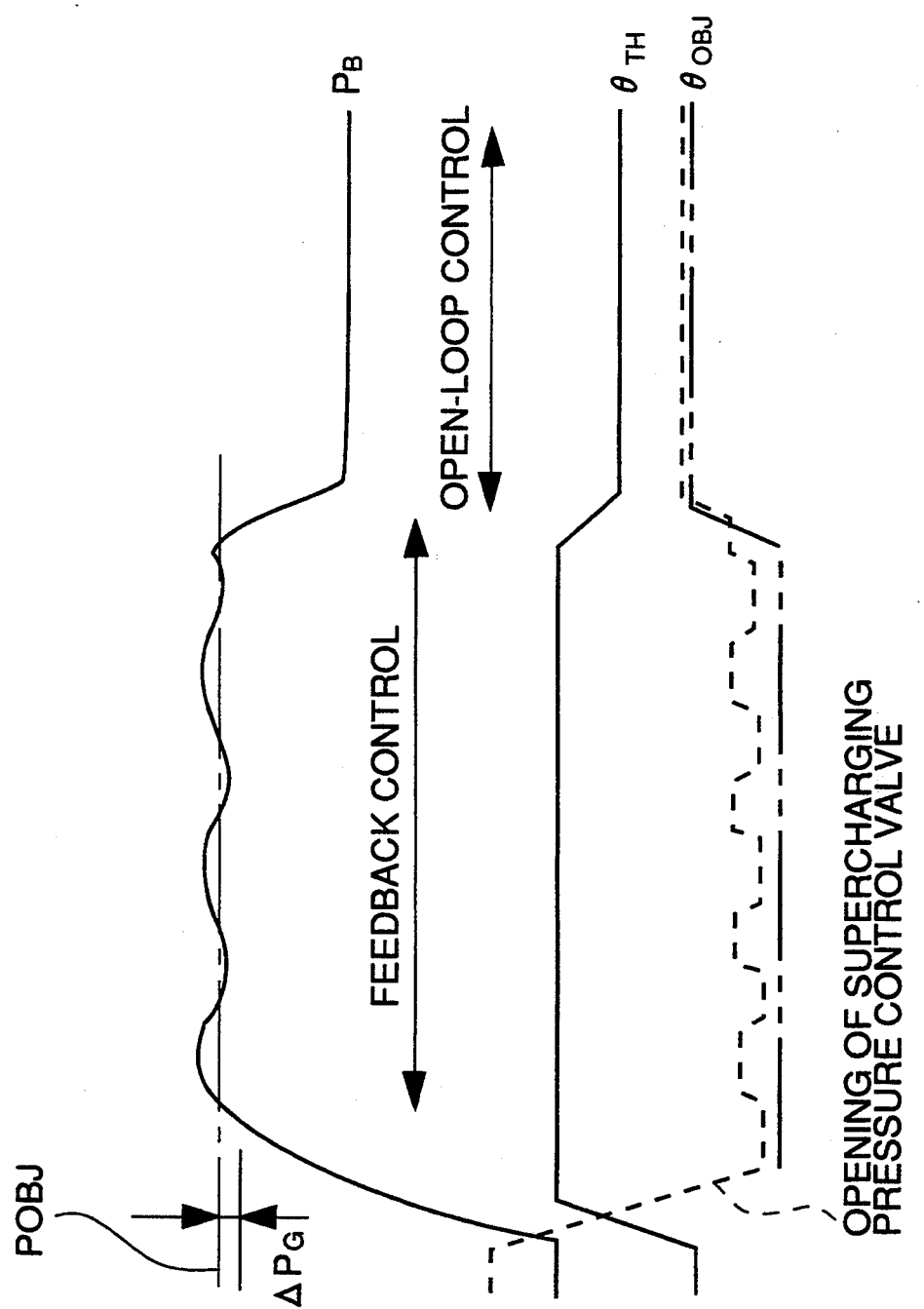
FIG. 14 is a diagram which is useful in explaining a manner of execution of the open-loop control and the feedback control.

In this connection, FIG. 14 shows a manner of control of the opening of the supercharging pressure control valve 5 (indicated by the broken line), i.e. an example of the feedback control in which the opening of the supercharging pressure control valve 5 is controlled so as to make the supercharging pressure PB equal to the desired maximum supercharging pressure value POBJ, and an example of the open-loop control in which the opening of the supercharging pressure control valve 5 is controlled to the desired opening value θOBJ.

According to the above embodiment, the ECU 7 changes the control mode from the open-loop control mode to the feedback control mode at the step 207 in FIG. 2, on condition that the supercharging pressure PB becomes equal to or higher than the desired maximum supercharging pressure value POBJ during the open-loop control, i.e. when the answer to the question of the step 405 in FIG. 4 becomes affirmative (YES). Therefore, even when the temperature of intake air has changed largely, there occurs almost no significant change in the supercharging pressure during the transition from the open-loop control to the feedback control. This enables to avoid occurrence of shocks, such as unexpected disturbing vibrations of the engine and noise, during the transition from the open-loop control to the feedback control.

Further, according to the above embodiment, the ECU 7 changes the control mode from the feedback control mode to the open-loop control mode in which the opening of the superchaging pressure control valve 5 is controlled to the desired opening value $\theta OBJ$, when the averaged actual opening value $\theta REF$ of the supercharging pressure control valve 5 becomes smaller than the desired opening value $\theta OBJ$ (dependent on actual operating conditions of the engine) determined by retrieving the $\theta OBJ$ map shown in FIG. 5 according to the throttle valve opening $\theta TH$ and the engine rotational speed NE, i.e. when the answer to the question of the step 409 becomes negative (NO). Therefore, even if the temperature of intake air has changed largely, there occurs almost no marked change in the opening of the supercharging pressure control valve 5, and hence there occurs almost no significant change in the supercharging pressure, during the transition from the feedback control to the open-loop control. This enables to avoid occurrence of shocks, such as unexpected disturbing vibrations of the engine and noise, during this transition.

Further, according to the first embodiment of the invention, when the averaged actual opening value $\theta REF$ of the supercharging pressure control valve 5 becomes smaller than the desired opening value $\theta OBJ$, i.e. when the answer to the question of the step 409 shown in FIG. 4 becomes affirmative (YES), the ECU 7 compares the present value of the throttle valve opening $\theta TH$ with the reference throttle valve opening value $\theta FB$ varying with the engine rotational speed Ne, and immediately changes the control mode from the feedback control mode to the open-loop control mode, when the throttle valve opening $\theta TH$ becomes smaller than the reference throttle valve opening value $\theta FB$, i.e. when the answer to the question of the step 410 shown in FIG. 4 becomes negative (NO). This enables to prevent a delayed change from the feedback control mode to the open-loop control mode when the throttle valve opening $\theta TH$ has changed suddenly.

In the embodiment described above, a mechanical type supercharger driven by the engine 1 is employed as the supercharger 3 arranged in the intake passage 2 of the engine 1, and a valve adapted to open and close the bypass passage 4 bypassing the supercharger 3 is employed as the supercharging pressure control valve 5, the opening of which is controlled to control the supercharging pressure. However, this is not limitative, but the supercharging pressure control system of the present invention may be also applied to an internal combustion engine including a compressor as the supercharger, which compressor is driven by an exhaust gas turbine which is caused to rotate by the energy of exhaust gases, i.e. a so-called turbocharger, and a waist gate valve for controlling the amount of exhaust gases supplied to the exhaust turbine, as the supercharging pressure control valve, in which the opening of the waist gate valve is controlled to control the supercharging pressure.

Next, a second embodiment of the invention will be described. The whole arrangement of component parts and elements of this embodiment is substantially the same as that of the first embodiment shown in FIG. 1, except for the fact that the ECU 7 is additionally supplied with a signal indicative the travelling speed V of the vehicle, detected by a vehicle speed sensor, not shown.

This embodiment is mainly distinguished from the first embodiment in that when the vehicle is cruising or accelerating, the ECU 7 is set to a normal supercharging pressure control mode, i.e. the supercharging pressure control described hereinabove in the first embodiment, whereas when the engine 1 is generating negative torque, the ECU 7 is set to a decelerating supercharging pressure control mode, in which the opening of the supercharging pressure control valve 5 is controlled to a reduced value according to operating conditions of the engine. More specifically, in the decelerating control mode, a desired opening value $\theta cc$ of the supercharging pressure control valve 5 is determined depending on operating conditions of the engine (i.e. the engine rotational speed NE and the throttle valve opening $\theta TH$ in the second embodiment), whereby the opening of the supercharging pressure control valve 5 is open loop-controlled to the desired opening value $\theta cc$, and when a predetermined time period has elapsed after entering the decelerating mode, a desired value $P2'$ of supercharging pressure is determined depending on the above-mentioned operating conditions of the engine, whereby the opening of the supercharging pressure control valve 5 is feedback-controlled so as to make the supercharging pressure P2 upstream of the throttle valve 13 equal to to the desired value $P2'$.

Figure 17:
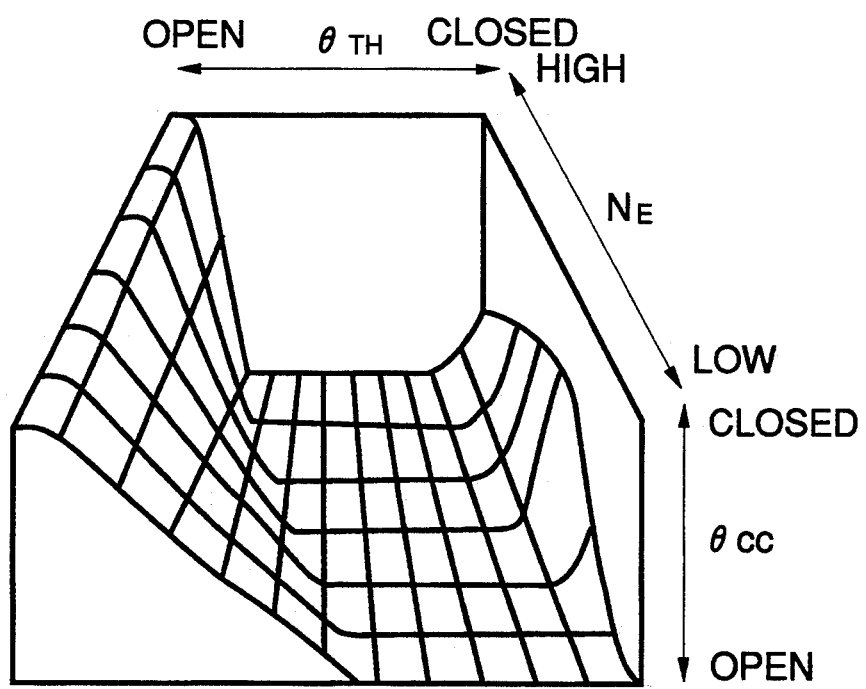
Figure 18:
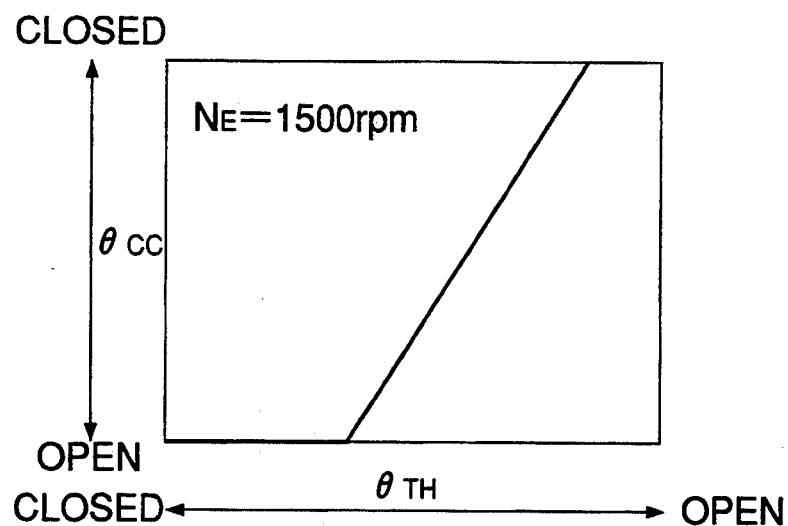
FIG. 18 is a two-dimensional map as part of the $\theta$cc map shown in FIG. 12, in which values of the desired opening value $\theta$cc are provided in a two-dimensional manner, corresponding to values of the throttle valve opening $\theta$TH assumed when the engine rotational speed NE is 1,500 rpm.
Figure 19:
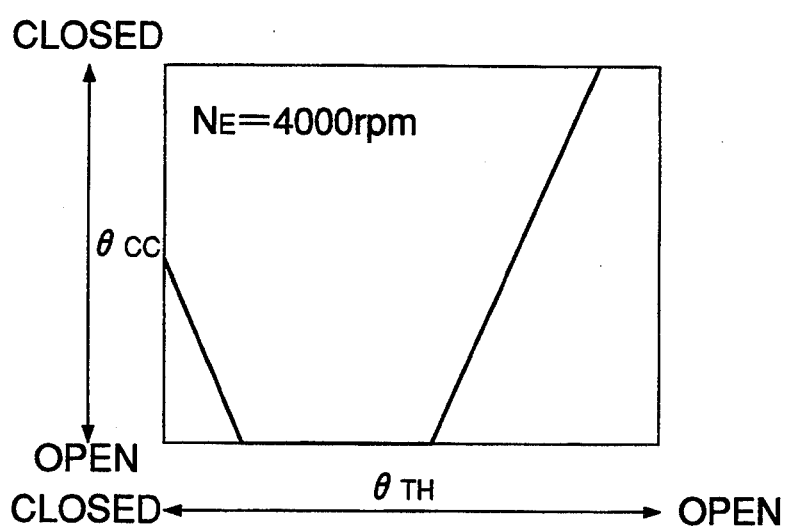
FIG. 19 is a two-dimensional map as part of the $\theta$cc map shown in FIG. 12, in which values of the desired opening value $\theta$cc are provided in a two dimensional manner, corresponding to values of the throttle valve opening $\theta$TH assumed when the engine rotational speed NE is 4,000 rpm.
Figure 20:
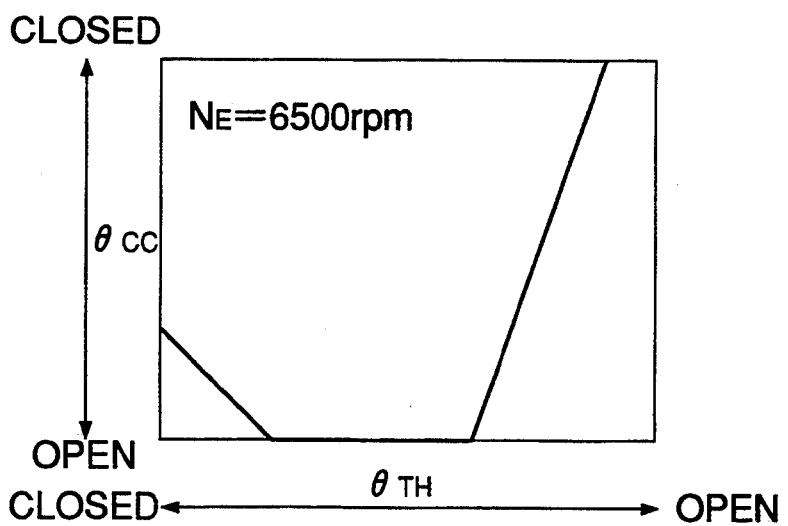
FIG. 20 is a two-dimensional map as part of the $\theta$cc map shown in FIG. 17, in which values of the desired opening value $\theta$cc are provided in a two-dimensional manner, corresponding to values of the throttle valve opening $\theta$TH assumed when the engine rotational speed NE is 6,500 rpm.

The desired opening value $\theta cc$ of the supercharging pressure control valve 5 is determined by retrieving a $\theta cc$ map stored in the memory means of the ECU 7, which is set, e.g. as shown in FIGS. 17 to 20, such that optimum values of the desired opening value $\theta cc$ are provided corresponding to values of the engine rotational speed NE and values of the throttle valve opening $\theta TH$. In this connection, FIG. 17 shows the $\theta cc$ map in which optimum values of the desired opening value $\theta cc$ are illustrated in a three-dimensional manner as a function of the engine rotational speed NE and the throttle valve opening $\theta TH$. FIGS. 18 to 20 show sectional portions or sub-maps of the $\theta cc$ map shown in FIG. 17, in which the desired opening value $\theta cc$ is depicted as functions of the throttle valve opening $\theta TH$ with the engine rotational speed NE assuming values of 1,500 rpm, 4,000 rpm, and 6,500 rpm, respectively.

Figure 16:
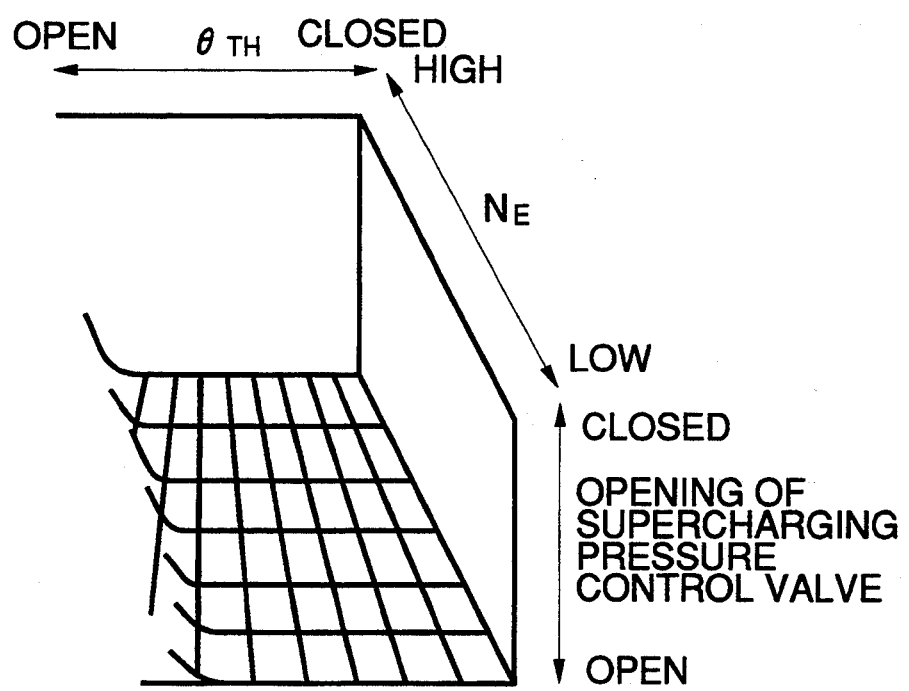
FIG. 16 is a three-dimensional map for a conventional supercharging pressure control system, in which values of the desired opening value of the supercharging pressure control valve are provided in a three-dimensional manner, corresponding to values of the engine rotational speed and those of the opening of the throttle valve.

As is clear from FIG. 17, when the throttle valve opening $\theta TH$ assumes very small values, the desired opening value $\theta cc$ assumes relatively small values which are dependent on the engine rotational speed NE. For example, as shown in FIG. 18, when the engine rotational speed NE is equal to 1,500 rpm in a region where the throttle valve opening $\theta TH$ assumes very small values, the desired opening value $\theta cc$ assumes the maximum value, i.e. the supercharging pressure control valve 5 is fully opened. As shown in FIG. 19, when the engine rotational speed NE is equal to 4,000 rpm in a region where the throttle valve opening $\theta TH$ assumes very small values, the desired opening value $\theta cc$ decrease, i.e. the supercharging pressure control valve 5 is progressively closed, as the throttle valve opening $\theta TH$ decreases. Further, as shown in FIG. 20, when the engine rotational speed NE is equal to 6,500 rpm in a region where the throttle valve opening $\theta TH$ assumes very small values, the desired opening value $\theta cc$ decreases more gently than when the rotational speed NE is equal to 4,000 rpm as shown in FIG. 19 and at the same time a value of the desired opening value $\theta cc$ assumed when the throttle valve 13 is fully closed is smaller than when the rotational speed NE is equal to 4,000 rpm as shown in FIG. 19. In contrast, in conventional supercharging pressure control systems, as shown in FIG. 16, generally, the supercharging pressure control valve is fully opened irrespective of the engine rotational speed NE in a region where the throttle valve opening θTH assumes very small values.

Figure 24:
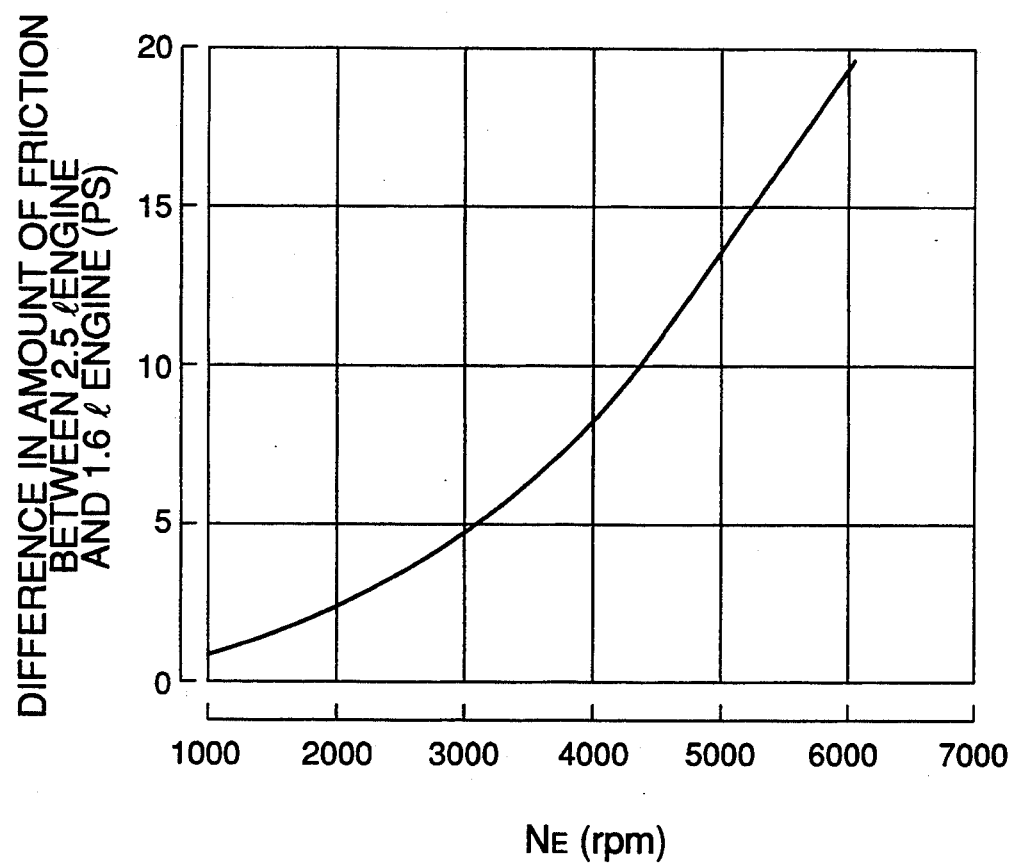
FIG. 24 is a graph showing the difference between an amount of friction applied on an internal combustion engine having an engine swept volume of 2.5 l and that applied on an internal combustion engine having an engine swept volume of 1.6 l, varying with the engine rotational speed NE.
Figure 25:
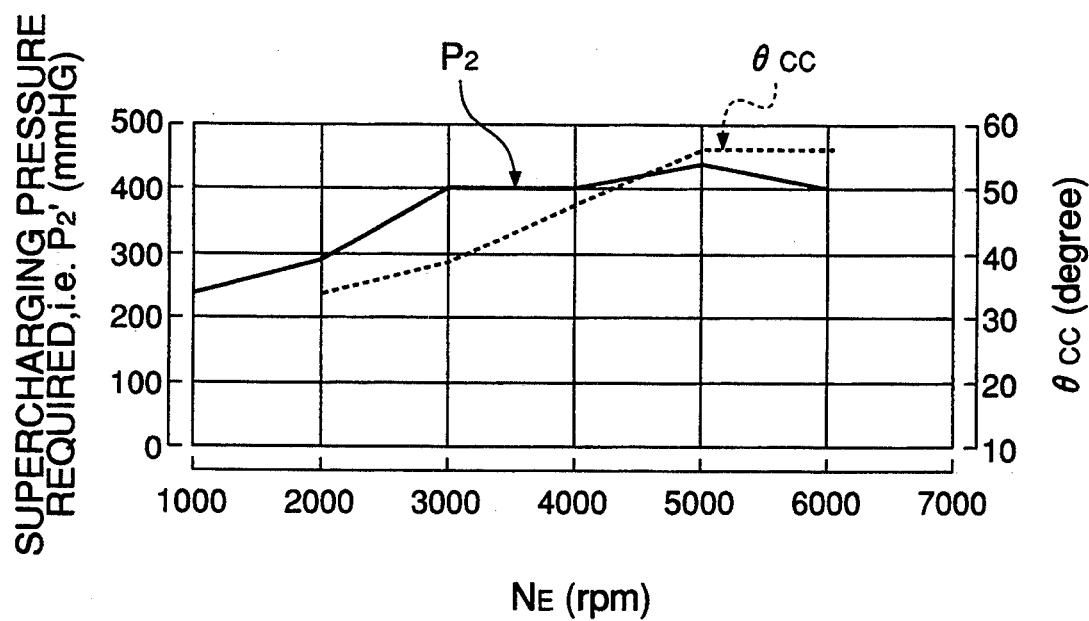
FIG. 25 is a graph showing the required or desired supercharging pressure value P2' representing an amount of work of the supercharger required for compensating for the difference in the amount of friction shown in FIG. 24, and the desired opening value $\theta$cc of the supercharging pressure control valve required for achieving the required or desired supercharging presure value P2'.

The θcc maps shown in FIGS. 17 to 20 are set based on FIGS. 24 and 25. FIG. 24 shows a manner of change in the difference between an amount of friction applied on an internal combustion engine having an engine swept volume of 2.5 l and that applied on an internal combustion engine having an engine swept volume of 1.6 l, in dependence on the engine rotational speed NE. Due to this difference in the amount of friction, although a supercharged internal combustion engine e.g. having an engine swept volume of 1.6 l can achieve accelerability (high engine output torque) equivalent to that of a naturally-charged internal combustion having an engine swept volume of 2.5 l, the same supercharged engine cannot attain decelerability (engine braking force) matching the accelerability, in deceleration of the vehicle. Therefore, in order to compensate for this gap in the amount of friction applied on the engine, the supercharger 3 is caused to perform work, the required amount of which work can be represented by the desired value P2′ of the supercharging pressure P2 upstream of the throttle valve 13, the desired supercharging pressure value P2′ being obtained by the desired opening value θcc of the supercharging pressure control valve 5, as shown in FIG. 25. In this connection, values of the desired supercharging pressure value P2′ and values of the desired opening value θcc in FIG. 25 are those assumed when the throttle valve opening θTH assumes the minimum value or the throttle valve 13 is fully closed.

Figure 21:
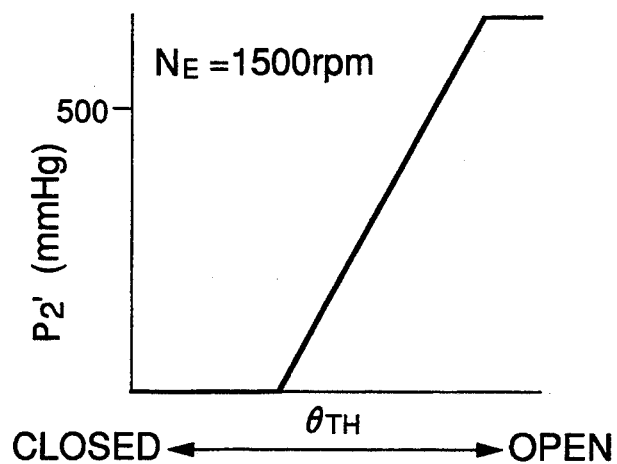
FIG. 21 is part of a P2' map, in which values of the desired supercharging pressure value P2' are provided corresponding to values of the throttle valve opening $\theta$TH assumed when the engine rotational speed NE is 1,500 rpm.
Figure 22:
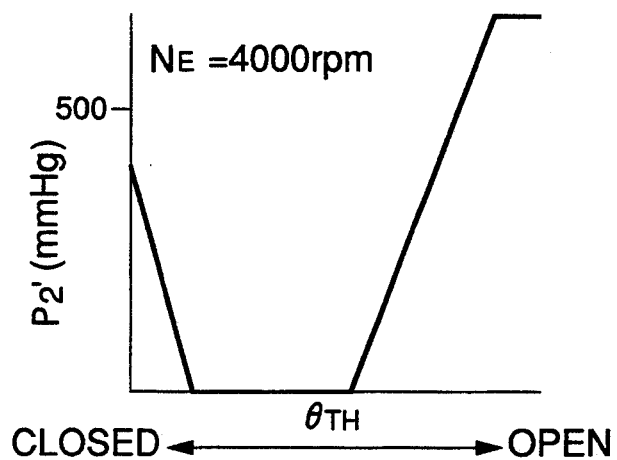
FIG. 22 is a map similar to that of FIG. 21, in which values of the desired supercharging pressure value P2' are provided corresponding to values of the throttle valve opening $\theta$TH assumed when the engine rotational speed NE is 4,000 rpm.
Figure 23:
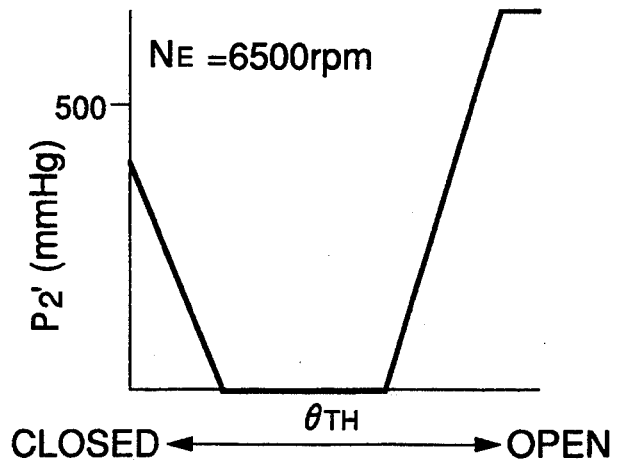
FIG. 23 is a map similar to that of FIG. 21, in which values of the desired supercharging pressure value P2' are provided corresponding to values of the throttle valve opening $\theta$TH assumed when the engine rotational speed NE is 6,500 rpm.

The desired supercharging pressure value P2′ is determined by retrieving a P2′ map stored in the memory means of the ECU 7, sectional portions or sub-maps of which are set, e.g. as shown in FIGS. 21 to 23, such that optimum values of the desired supercharging pressure value P2′ are provided corresponding to values of the engine rotational speed NE and those of the throttle valve opening θTH, respectively. The P2′ map containing the sub-maps as part thereof is set based on FIGS. 24 and 25, similarly to the case of the desired opening value θcc.

Next, the operation of the supercharging pressure control system according to the second embodiment will be described.

Figure 26:
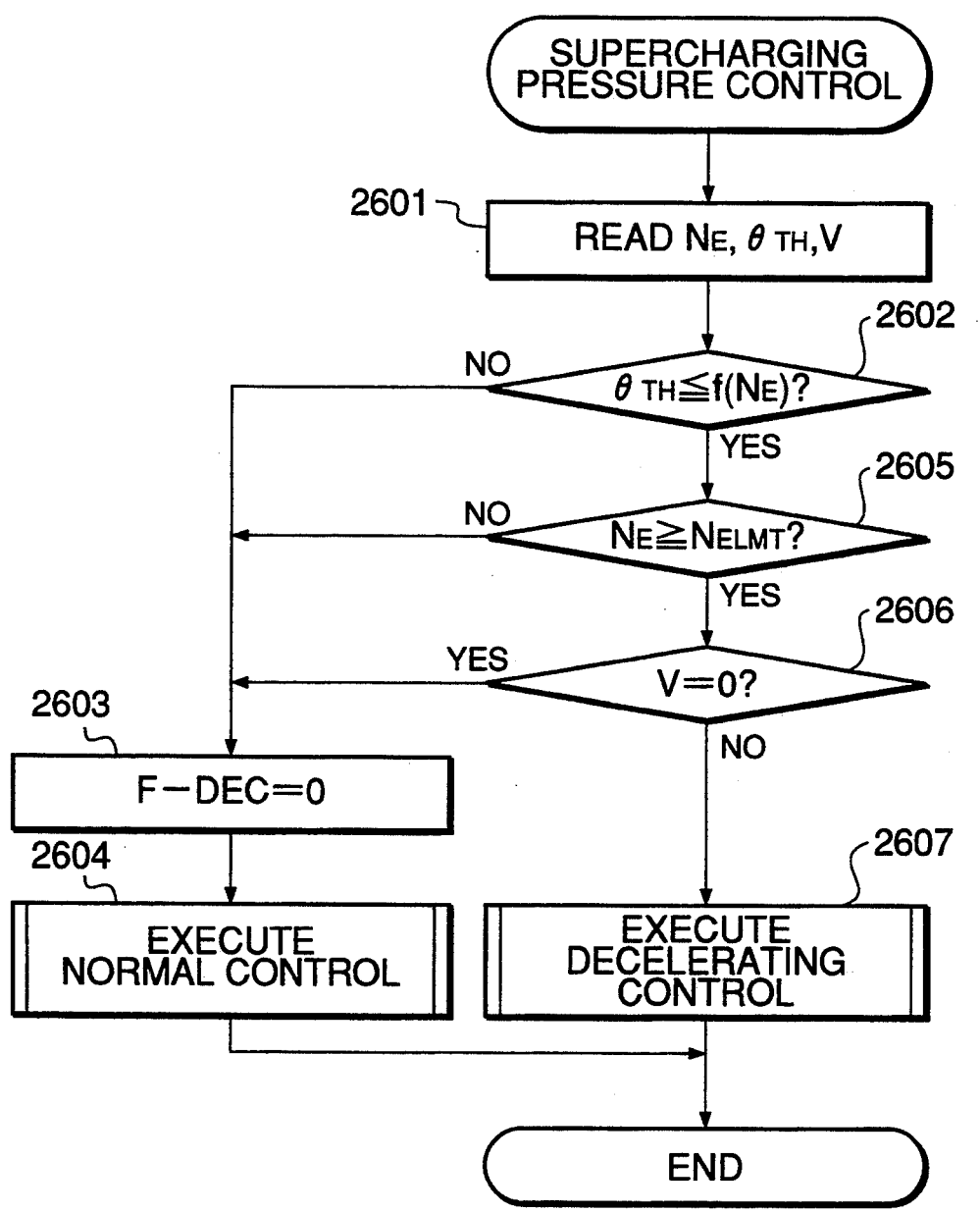
FIG. 26 is a flowchart showing a main routine for performing supercharging pressure control by a supercharging pressure control system according to a second embodiment of the invention.

The ECU 7 executes a main routine shown in FIG. 26, for controlling supercharging pressure. In the main routine, the engine rotational speed NE detected by the NE sensor, the throttle valve opening θTH detected by the throttle valve opening sensor 23, and the vehicle speed V detected by the vehicle speed sensor are read at a step 2601.

Figure 27:
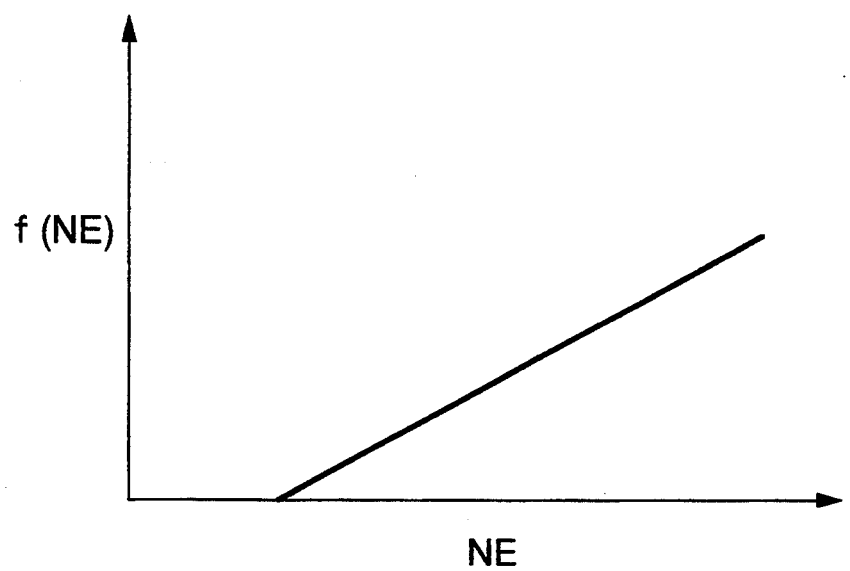
FIG. 27 is a graph showing a predetermined function f(NE) set relative to the engine rotational speed NE in a region where the engine generates negative torque.

Then, at a step 2602, it is determined whether or not the throttle valve opening θTH detected falls in a region defined below a predetermined function f(NE) as shown in FIG. 27. The function f(NE) is set in a region where the engine 1 generates negative torque according to the operating characteristics of thereof, and when the throttle valve opening θTH is smaller than the function f(NE), the absolute value of negative torque is increased by controlling the desired valve opening θcc of the supercharging pressure control valve 5 to a reduced value.

If the answer to the question of the step 2602 is negative (NO), i.e. if θTH>f(NE), it is judged that the vehicle is cruising or accelerating, and the program proceeds to a step 2603, where a control mode determination flag F-DEC is set to "0". Then, the program proceeding to a step 2604, where the aforementioned normal control mode of supercharging pressure control is performed, followed by terminating the program.

If the answer to the question of the step 2602 is affirmative (YES), i.e. if θTH≦f(NE), the program proceeds to a step 2605, where it is determined whether or not the engine rotational speed NE is equal to or higher than a predetermined value NELMT (e.g. 1,500 rpm). If the answer to this question is negative (NO), i.e. if NE<NELMT, the program proceeds to the step 2603, whereas if the answer is affirmative (YES), i.e. if NE≧ NELMT, the program proceeds to a step 2606, where it is determined whether or not the vehicle speed V is equal to 0. If the answer to this question is affirmative (YES), i.e. if the vehicle is standing and hence the vehicle speed V is equal to 0, the program proceeds to the step 2603, whereas if the answer is negative (NO), i.e. if the vehicle speed V is not equal to 0, it is judged that the engine 1 is generating negative torque, and the program proceeds to a step 2607, where the decelerating control mode is selected to carry out decelerating supercharging pressure control.

Thus, if θTH≦f(NE), NE≧NELMT, and at the same time the vehicle speed V is not equal to 0, it is judged that the engine is generating negative torque, and the decelerating control mode is selected.

Figure 28:
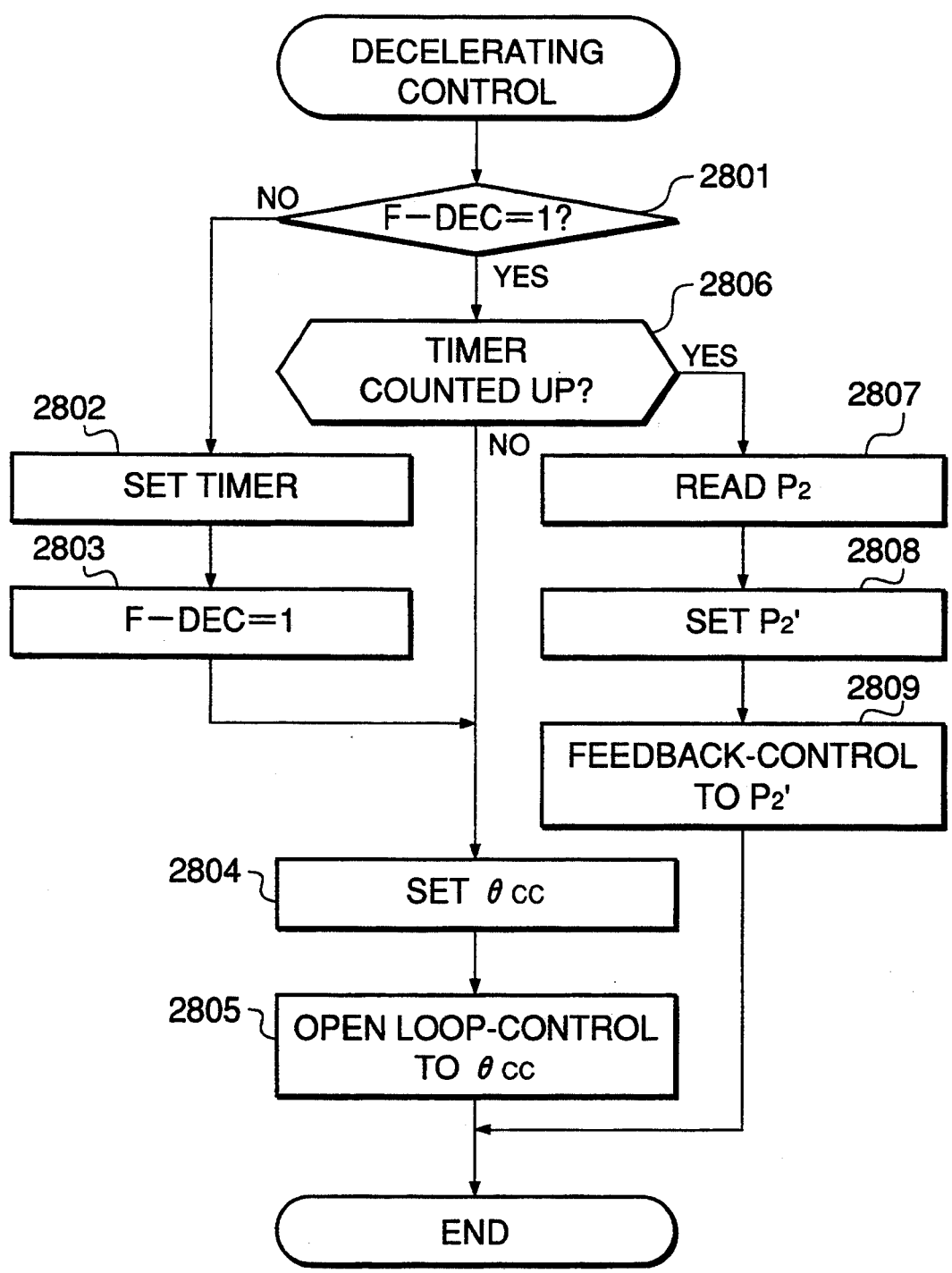
FIG. 28 is a flowchart showing a subroutine for carrying out supercharging pressure control in a decelerating mode according to the second embodiment of the invention.

The decelerating supercharging control is executed by a subroutine shown in FIG. 28. In the subroutine, first at a step 2801, it is determined whether or not the control mode determination flag F-DEC is equal to 1. Since the flag F-DEC has been initially set to 0 at the step 2603 in FIG. 26, the answer to the question of the step 2801 is negative (NO), and the program proceeds to a step 2802, where a timer is set and started, and then to a step 2803, where the flag F-DEC is set to 1. Then, the program proceeds to a step 2804, where the desired opening value θcc of the supercharging pressure control valve 5 is determined by retrieving the θcc map (see FIGS. 17 to 20) according to the engine rotational speed NE and the throttle valve opening θTH, and subsequently to a step 2805, where the supercharging pressure control valve 5 is open loop-controlled to the desired opening value θcc determined at the step 2804, followed by terminating the program. In this connection, in the following loops, if the answer to the question of the step 2606 remains negative (NO), it is judged that the engine 1 is decelerating or the engine 1 is generating negative torque, so that the program proceeds to the step 2801 in FIG. 28 to continue the decelerating control mode.

Since the flag F-DEC has been set to 1 at the step 2803 of declerating control mode, in the following loops, the answer to the question of the step 2801 becomes affirmative (YES), and the program proceeds to a step 2806, where it is determined the timer has counted up a predetermined time period. If the answer to this question is negative (NO), i.e. if the timer has not counted up the predetermined time period, the program proceeds to the steps 2804 and 2805 so as to execute the open-loop control. If the answer to the question of the step 2806 becomes affirmative (YES), i.e. if the timer has counted up the predetermined time period, the program proceeds to a step 2807, where the supercharging pressure P2 downstream of the throttle valve opening 13 detected by the P2 sensor 19 is read. Then, at a step 2808, the desired supercharging pressure value P2′ is determined by retrieving the P2′map (see FIGS. 21 to 23) according to the engine rotational speed NE and the throttle valve opening $\theta$TH. Then, the program proceeds to a step 2809, where the opening of the supercharging pressure control valve 5 is feedback-controlled so as to make the supercharging pressure P2 read at the step 2807 equal to the desired supercharging pressure value P2', followed by terminating the program.

Thus, in the decelerating control mode of supercharging pressure control carried out when the engine 1 is generating negative torque, the opening of the supercharging pressure control valve 5 is first open loop-controlled to the desired opening value $\theta$cc, and then after lapse of the predetermined time period from the start of the decelerating control mode, the opening of the supercharging pressure control valve 5 is feedback-controlled so as to make the supercharging pressure P2 equal to the desired supercharging pressure value P2', whereby the opening of the supercharging pressure control valve 5 is controlled to a reduced value depending on operating conditions of the engine (the engine rotational speed NE and the throttle valve opening $\theta$TH, in the case of the present embodiment). By thus controlling the supercharing pressure control valve 5, the amount of work effected by the supercharger 3 is increased by a degree corresponding to the decremental value of the opening of the supercharging pressure control valve 5, increasing an amount of friction applied on the engine 1 and hence the braking force of the engine 1, which enables the supercharged engine 1 to achieve decelerability in a manner matching accelerability thereof enhanced by supercharging.

According to the second embodiment, in the decelerating control mode, the open-loop control is first executed, and upon lapse of the predetermined time period from the start of the decelerating supercharging control, the feedback control is started, which prevents the control of the supercharging pressure control valve 5 from being overshooted.

Next, a supercharging pressure control system according to a variation of the second embodiment will be described with reference to FIGS. 29 to 32.

In this variation of the second embodiment, in the decelerating control mode carried out when it is determined that the engine 1 is generating negative torque, the opening of the supercharging pressure control valve 5 is decreased depending on operating conditions of the vehicle (the engine rotational speed NE of the engine, and a gear shift position of a transmission, not shown). More specifically, in the decelerating control mode of this variation, a desired opening value $\theta$cc' of the supercharging pressure control valve 5 is determined depending on the engine rotational speed NE and the gear shift position, whereby the opening of the valve 5 is open loop-controlled to the desired opening value $\theta$cc'. When a predetermined time period has elapsed after the start of the supercharging pressure control in the decelerating control mode, a desired supercharging pressure value P2" is determined depending on the engine rotational speed NE and the gear shift position, whereby the opening of the supercharging pressure control valve 5 is feedback-controlled so as to make the supercharging pressure P2 upstream of the throttle valve 13 equal to the desired supercharging pressure value P2".

Figure 31:
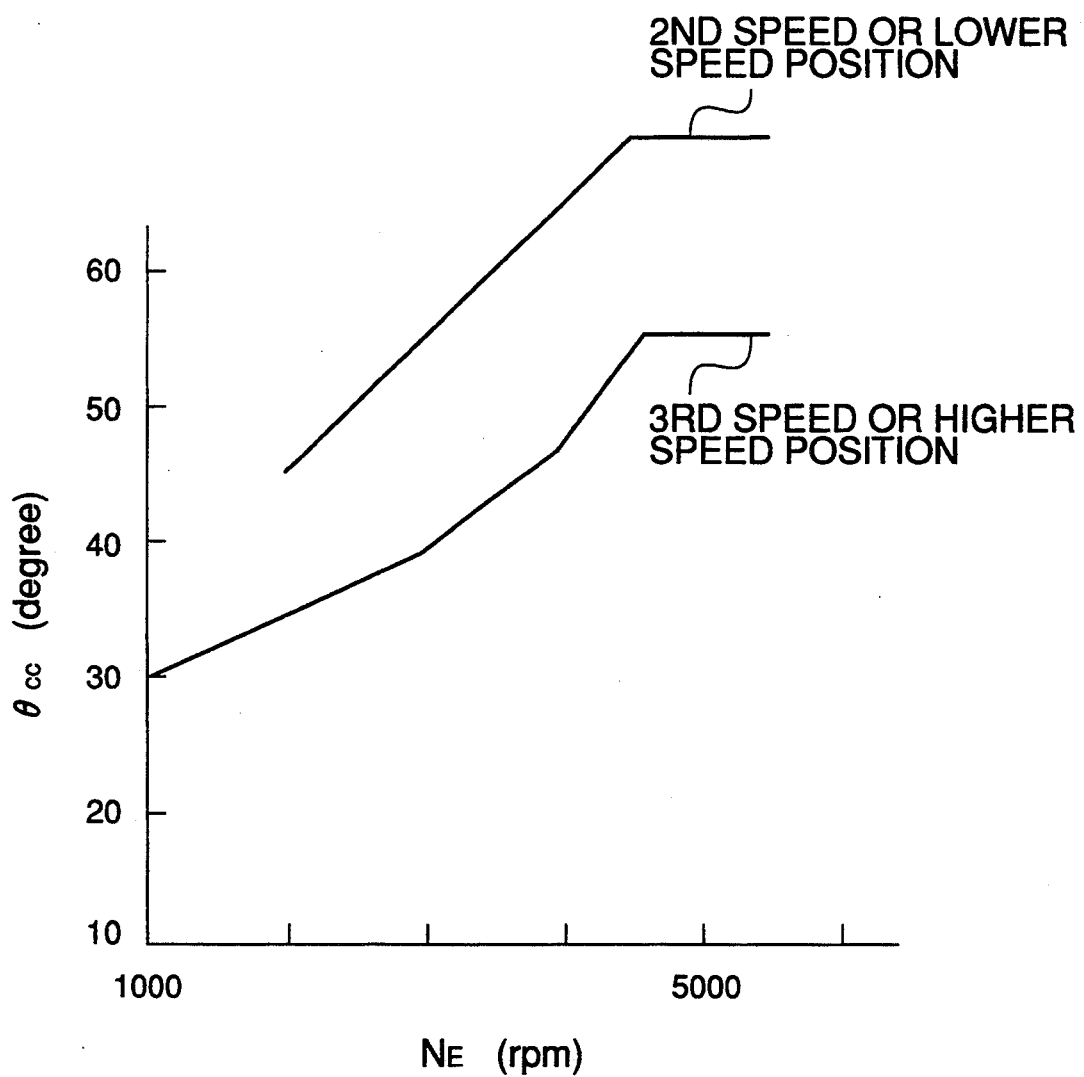
FIG. 31 shows $\theta$cc' map in which values of the desired opening value $\theta$cc' of the supercharging pressure control valve are provided corresponding to values of the engine rotational speed NE and shift positions of a gear of a transmission.

The desired opening value $\theta$cc' of the supercharging pressure control valve 5 is determined by retrieving $\theta$cc' map stored in the memory means of the ECU 7, which is set e.g. as shown in FIG. 31 such that optimum values of the desired opening value $\theta$cc' are provided corresponding to values of the engine rotational speed NE and shift positions of the gear of the transmission. The $\theta$cc' map is also set based on FIGS. 24 and 25, referred to hereinbefore.

Further, according to the variation of the second embodiment, to improve driving feelings upon deceleration, the desired opening value $\theta$cc' is set, as is clear from FIG. 31, such that it assumes larger values when the gear of the transmission is in one of the second and lower speed positions than when the gear is in one of the third and higher speed positions, whereby the amount of friction applied on the engine is increased to a smaller degree in the former case than in the latter case to increase a decelerating force (engine braking force) by a smaller amount in the former case than in the latter case.

Figure 32:
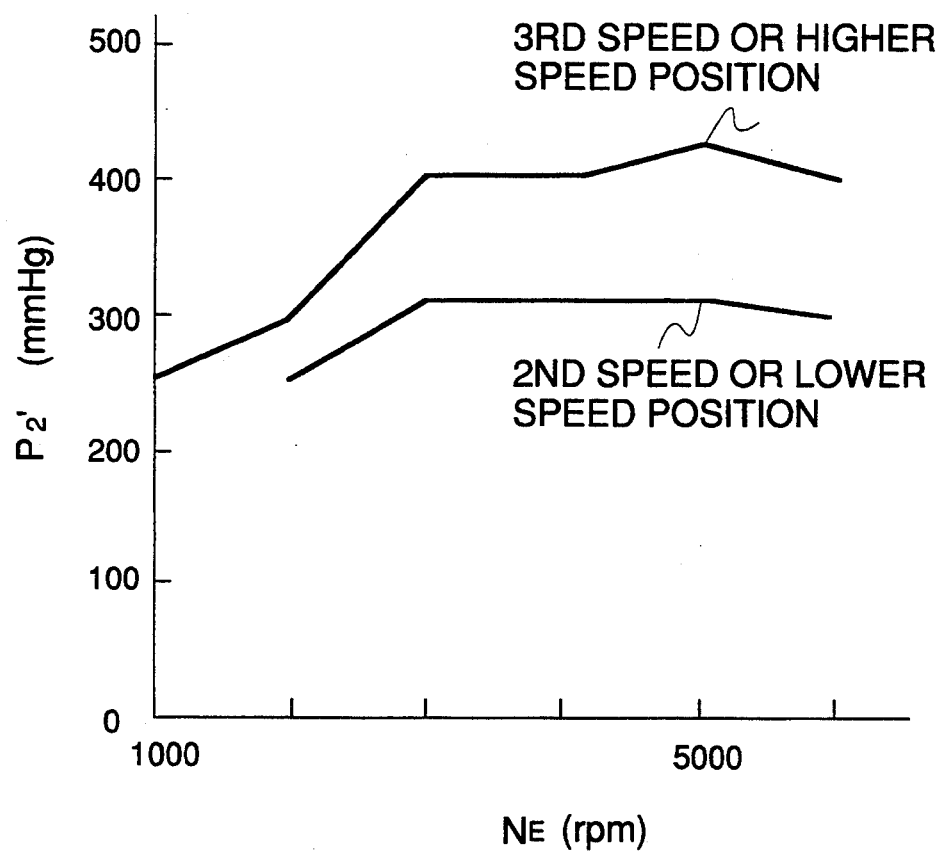
FIG. 32 shows a P2" map in which values of the desired supercharging pressure value P2" are provided corresponding to values of the engine rotational speed NE and the shift positions of the gear of the transmission.

The desired supercharging pressure value P2" is determined by retrieving a P2" map stored in the memory means of the ECU 7, which is set e.g. as shown in FIG. 32, such that optimum values of the desired supercharging pressure value P2" are provided corresponding to values of the engine rotational speed NE and the shift positions of the gear of the transmission. The P2" map is also set, similarly to the desired opening value $\theta$cc', based on FIGS. 24 and 25. The desired supercharging pressure value P2" is set in the P2" map, similarly to the desired opening value $\theta$cc', such that it assumes lower values when the gear of the transmission is the second speed position than when the gear is in the third speed position, whereby the amount of friction applied on the engine is increased to a smaller degree in the former case than in the latter case to increase the decelerating force (engine braking force) by a smaller amount in the former case than in the latter case.

Next, the operation of the supercharging pressure control system according to the variation of the second embodiment will be described.

Figure 29:
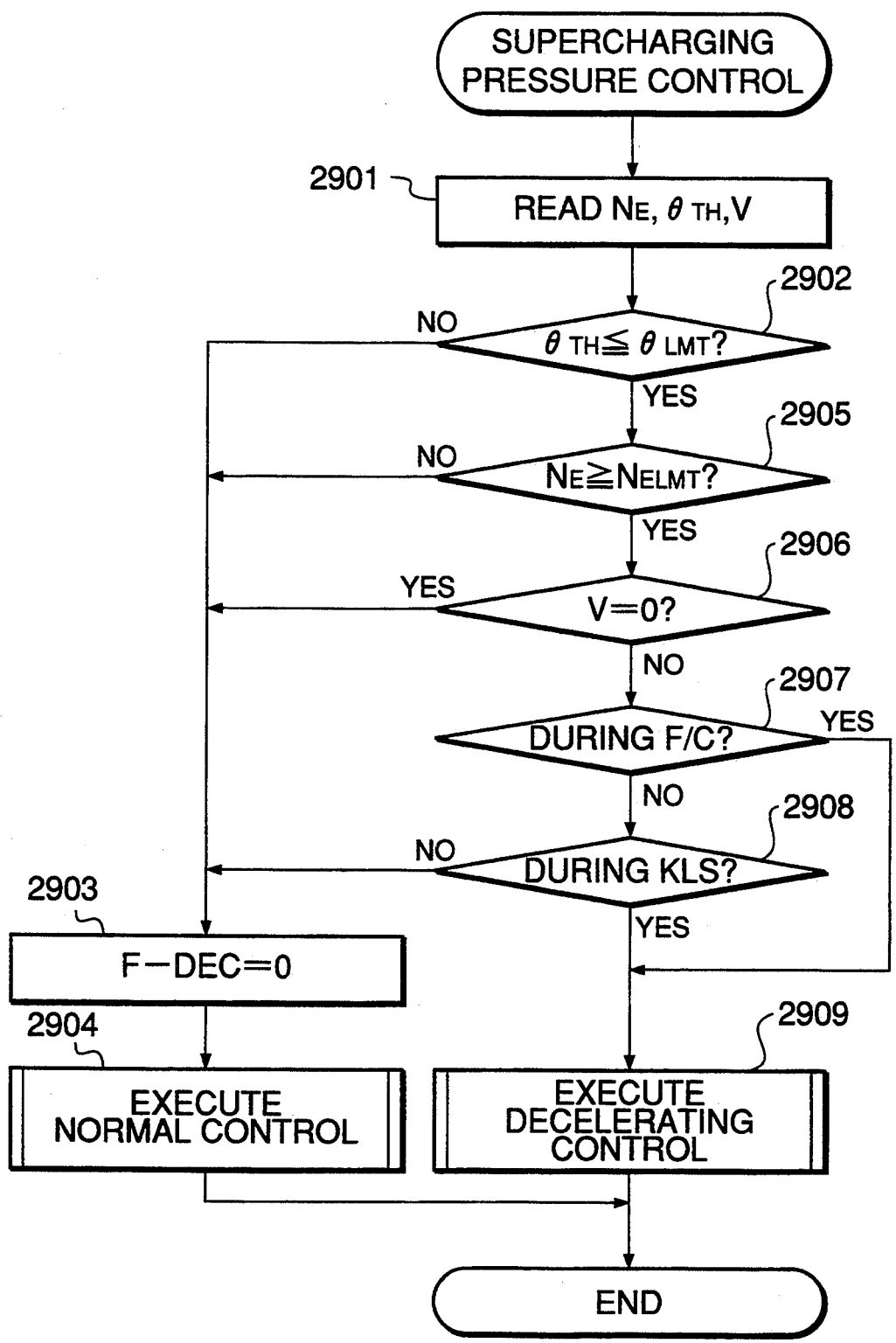
FIG. 29 is a flowchart showing a main routine for performing supercharging pressure control by a supercharging pressure control system according to a variation of the second embodiment of the invention.

The ECU 7 executes a main routine for controlling supercharging pressure, as shown in FIG. 29. In this main routine, first at a step 2901, the engine rotational speed NE detected by the NE sensor, the throttle valve opening $\theta$TH detected by the throttle valve opening sensor 23, and the vehicle speed V detected by the vehicle speed sensor are read.

Then, at a step 2902, it is determined whether or not the throttle valve opening $\theta$TH is equal to or smaller than a predetermined value $\theta$LMT. If the answer to this question is negative (NO), i.e. if $\theta$TH $>\theta$LMT, it is judged that the vehicle is cruising or accelerating, and the program proceeds to a step 2903, where the control mode determination flag F-DEC is set to 0. Then, at a step 2904, the normal control mode described above is executed, followed by terminating the program.

If the answer to the question of the step 2902 is affirmative (YES), i.e. if $\theta$TH$\leq\theta$LMT, the program proceeds to a step 2905, where it is determined whether or not the engine rotational speed NE is equal to or larger than the predetermined value NELMT 1,500 rpm). If the answer to this question is negative (NO), i.e. if NE<NELMT, the program proceeds to the step 2903, whereas if the answer is affirmative (YES), i.e. if NE$\geq$ NELMT, the program proceeds to a step 2906, where it is determined whether or not the vehicle speed V is equal to 0. If the answer to this question is affirmative (YES), i.e. if the vehicle is standing and hence the vehicle speed is equal to 0, the program proceeds to the step 2903.

On the other hand, if the answer to the question of the step 2906 is negative (NO), i.e. if the vehicle speed V is not equal to 0, the program proceeds to a step 2907, where it is determined whether or not the supply of fuel to the engine is being inhibited, i.e. the fuel cut is being carried out (i.e. during F/C). If the answer to this question is affirmative (YES), i.e. if fuel cut is being carried out, it is judged that the engine 1 is decelerating (the engine 1 is generating negative torque), and the program proceeds to a step 2909, whereas if the answer is negative (NO), the program proceeds to a step 2908, where it is determined whether or not leaning of an air-fuel mixture is being carried out (i.e. during KLS). If the answer to this question is negative (NO), the program proceeds to the step 2903, whereas if the answer is affirmative (YES), it is judged that the engine 1 is decelerating (the engine 1 is generating negative torque), and the program proceeds to the step 2909.

Thus, if $\theta TH \leq \theta LMT$, $NE \geq NELMT$, V is not equal to 0, and at the same time fuel cut or leaning of the mixture is being carried out, it is determined that the engine 1 is decelerating (the engine 1 is generating negative torque), so that the program proceeds to the step 2909, where the decelerating control mode is selected to carry out decelerating supercharging pressure control.

Figure 30:
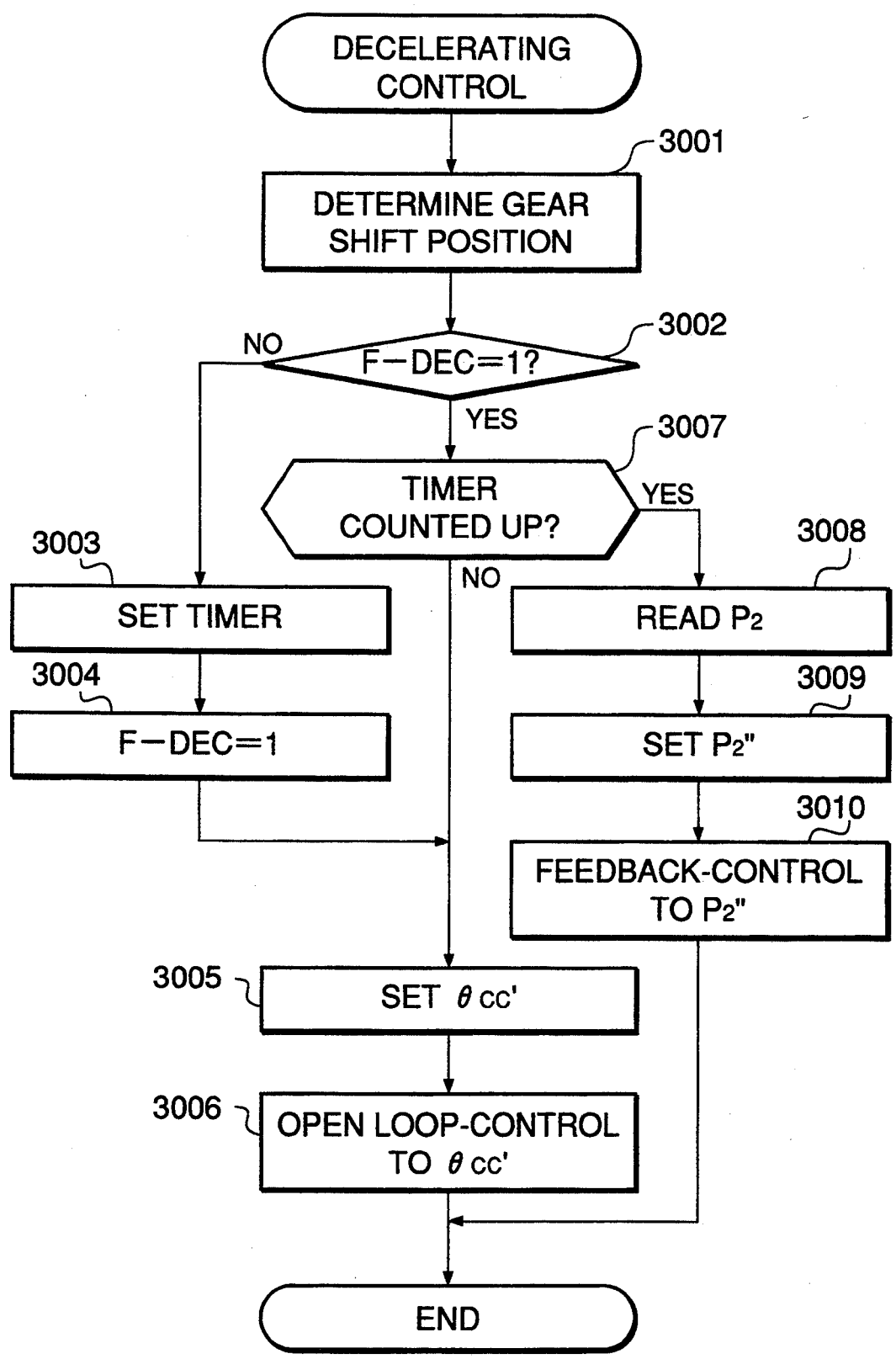
FIG. 30 is a flowchart showing a subroutine for carrying out supercharging pressure control in a decelerating mode according to the variation of the second embodiment of the invention.

The decelerating supercharging pressure control according to the variation of the second embodiment is carried out by a subroutine shown in FIG. 30. In the subroutine, first at a step 3001, the gear shift position currently in use is determined by gear shift position-determining means, not shown. Then, at a step 3002, it is determined whether or not the control mode determination flag F-DEC is equal to 1. Since the flag F-DEC has been initially set to 0 at the step 2903 in FIG. 29, the answer to this question on the first occasion is negative (NO), and the program proceeds to a step 3003, where a timer is set and started, and then to a step 3004, where the flag F-DEC is set to 1. Then, at a step 3005, the desired opening value $\theta cc'$ of the supercharging pressure control valve 5 is determined by retrieving the $\theta cc'$ map (see FIG. 31) according to the engine rotational speed NE and the gear shift position determined at the step 3001, and the program proceeds to a step 3006, where the opening of the supercharging pressure control valve 5 is open loop-controlled to the desired opening value $\theta cc'$ determined at the step 3005, followed by terminating the program. In this connection, in the following loops, if the answer to the question of the step 2907 or the step 2908 remains affirmative (YES), it is judged that the engine 1 decelerating or the engine 1 is generating negative torque, the program proceeds to the step 3001 in FIG. 30 to continue the decelerating control mode.

In the following loops, since the flag F-DEC has been set to 1 at the step 3004 of the decelerating control mode in the preceding loop, the answer to the question of the step 3002 becomes affirmative (YES), and the program proceeds to a step 3007, where it is determined whether or not the timer has counted up a predetermined time period. If the answer to this question is negative (NO), i.e. if the timer has not counted up the predetermined time period, the program proceeds to the steps 3005 and 3006 so as to execute the open-loop control. If the answer to the question of the step 3007 becomes affirmative (YES), i.e. if the timer has counted up the predetermined time period, the program proceeds to a step 3008, where the supercharging pressure P2 downstream of the throttle valve opening 13 detected by the P2 sensor 19 is read. Then, at a step 3009, the desired supercharging pressure value P2" is determined by retrieving the P2" map (see FIG. 32) according to the engine rotational speed NE and the gear shift position. Then, the program proceeds to a step 3010, where the opening of the supercharging pressure control valve 5 is feedback-controlled so as to make the supercharging pressure P2 read at the step 3008 equal to the desired supercharging pressure value P2" determined at the step 3009, followed by terminating the program.

Thus, in this variation of the decelerating control mode of supercharging pressure control carried out when the engine 1 is generating negative torque, the opening of the supercharging pressure control valve 5 is first open loop-controlled to the desired opening value $\theta cc'$, and then after lapse of the predetermined time period from the start of the decelerating control mode, the opening of the supercharging pressure control valve 5 is feedback-controlled so as to make the supercharging pressure P2 equal to the desired supercharging pressure value P2", whereby the opening of the supercharging pressure control valve 5 is controlled to a reduced value depending on operating conditions of the engine (the engine rotational speed NE and the gear shift position, in the case of this variation). By thus controlling the supercharging pressure control valve 5, the amount of work effected by the supercharger 3 is increased by a degree corresponding to the decremental value of the opening of the supercharging pressure control valve 5, increasing the amount of friction applied on the engine 1 and hence the braking force of the engine 1, which enables the supercharged engine 1 to achieve decelerability in a manner matching accelerability thereof enhanced by supercharging.

According to this variation as well, in the decelerating control mode, the open-loop control is first executed, and upon lapse of the predetermined time period from the start of the decelerating supercharging pressure control, the feedback control is started, which prevents the control of the supercharging pressure control valve 5 from being overshooted.

Further, according to this variation, only if $\theta TH \leq \theta LMT$, $NE \geq NELMT$, the vehicle speed V is not equal to 0, and at the same time fuel cut or leaning of the mixture is being carried out, it is judged that the engine 1 is decelerating (the engine 1 is generating negative torque), and the decelerating supercharging pressure control is carried out, which enables to prevent fuel consumption from being increased, and hence makes this variation more preferable from the practical point of view.

Further, although in the above embodiments and variation, the engine rotational speed NE is detected by the NE sensor, not shown, this is not limitative but the engine rotational speed Ne may be calculated from the vehicle speed V, the reduction ratio of the gear of the transmission, etc.

Further, although in the above embodiments and variation, the throttle valve opening $\theta TH$ of the throttle valve 13 is detected by the throttle valve opening sensor 23, this is not limitative but the throttle valve opening $\theta TH$ may be calculated from an amount of intake air upstream of the throttle valve 13, detected by an air-flowmeter, not shown, the temperature of the intake air upstream of the throttle valve 13, the supercharging pressure values P2 and PB, etc.

What is claimed is:

1. In a supercharging pressure control system for a supercharged internal combustion engine including an intake passage for guiding intake air to said engine, and a supercharger arranged in said intake passage for supercharging said engine with said intake air, said supercharging pressure control system comprising supercharging pressure-detecting means arranged in said intake passage at a location downstream of said supercharger for detecting an actual value of supercharging pressure of said intake air located downstream of said supercharger and caused by said supercharger, a bypass passage connected to said intake passage such that said bypass passage bypasses said supercharger, a supercharging pressure control valve arranged in said bypass passage for controlling said supercharging pressure of said intake air, driving means connected to said supercharging pressure control valve for driving said supercharging pressure control valve, and control means connected to said driving means for controlling said driving means, the improvement wherein said control means includes:

desired supercharging pressure value-setting means for setting a desired value of said supercharging pressure of said intake air;

valve opening-determining means for determining an actual value of degree of opening of said supercharging pressure control valve;

desired opening value-setting means for setting a desired value of said degree of opening of said supercharging pressure control valve depending on operating conditions of said engine; and control mode-selecting means for selecting a feedback control mode on the one hand in which said degree of opening of said supercharging pressure control valve is controlled so as to make said actual value of said supercharging pressure of said intake air detected by said supercharging pressure-detecting means equal to said desired value of said supercharging pressure of said intake air set by said desired supercharging pressure value-setting means, when said actual value of said supercharging pressure of said intake air detected by said supercharging pressure-detecting means has reached said desired value of said supercharging pressure of said intake air set by said desired supercharging pressure value-setting means, and for selecting an open-loop control mode on the other hand in which said degree of opening of said supercharging pressure control valve is controlled to said desired value of said degree of opening of said supercharging pressure control valve when said actual value of said degree of opening of said supercharging pressure control valve determined by said valve opening-determining means during said feedback control becomes smaller than said desired value of said degree of opening of said supercharging pressure control valve.

2. A supercharging pressure control system according to claim 1, wherein said engine includes an intercooler arranged across said intake passage downstream of said supercharger for cooling said intake air pressurized by said supercharger, said supercharging pressure control system including engine rotational speed-detecting means for detecting the rotational speed of said engine, and temperature-detecting means for detecting a temperature of a coolant supplied to said intercooler, said desired supercharging pressure value-setting means being adapted to set said desired value of said supercharging pressure either to a first value determined according to the rotational speed of said engine or to a second value determined according to the temperature of said coolant.

3. A supercharging pressure control system according to claim 2, wherein said desired supercharging pressure value-setting means sets said desired value of said supercharging pressure to the lower one of said first value and said second value.

4. A supercharging pressure control system according to claim 1, 2 or 3, wherein said engine includes a throttle valve arranged across said intake passage, said supercharging pressure control system including throttle valve opening-detecting means for detecting the actual degree of opening of said throttle valve, said control means including reference throttle valve opening-setting means for setting a reference value of said degree of opening of said throttle valve according to the rotational speed of said engine, said control mode-selecting means further comparing said actual degree of opening of said throttle valve detected by said throttle valve opening-detecting means with said reference value of said degree of opening of said throttle valve, when said actual value of said degree of opening of said supercharging pressure control valve determined during said feedback control is equal to or larger than said desired value of said degree of opening of said supercharging pressure control valve, and selecting said open-loop control mode when said degree of opening of said throttle valve becomes smaller than said reference value of said degree of opening of said throttle valve.

5. A supercharging pressure control system according to claim 4, wherein said actual value of said degree of opening of said supercharging pressure control valve determined during feedback control is an averaged value of actual values of said degree of opening of said supercharging pressure control valve including a newest value of said degree of opening determined during said feedback control.

* * * * *

UNITED STATES PATENT AND TRADEMARK OFFICE
CERTIFICATE OF CORRECTION

PATENT NO. : 5,345,920
DATED : September 13, 1994
INVENTOR(S) : Sugino et al.

It is certified that error appears in the above-indentified patent and that said Letters Patent is hereby corrected as shown below:

<u>In the Abstract;</u>

Line 4, after "air" delete the comma ", ".

Signed and Sealed this

Twenty-first Day of November, 1995

Attest:

BRUCE LEHMAN

Attesting Officer

Commissioner of Patents and Trademarks